US012289773B2

(12) United States Patent
Wu et al.

(10) Patent No.: US 12,289,773 B2
(45) Date of Patent: Apr. 29, 2025

(54) ACCESSING A COMMUNICATION CHANNEL BY MULTIPLE USER DEVICES AT THE SAME TIME

(71) Applicant: GOOGLE LLC, Mountain View, CA (US)

(72) Inventors: Chih-Hsiang Wu, Taoyuan (TW); Kao-Peng Chou, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 53 days.

(21) Appl. No.: 17/286,746

(22) PCT Filed: Jul. 23, 2020

(86) PCT No.: PCT/US2020/043187
§ 371 (c)(1),
(2) Date: Apr. 19, 2021

(87) PCT Pub. No.: WO2021/030024
PCT Pub. Date: Feb. 18, 2021

(65) Prior Publication Data
US 2022/0174748 A1    Jun. 2, 2022

Related U.S. Application Data

(60) Provisional application No. 62/886,479, filed on Aug. 14, 2019, provisional application No. 62/907,166, filed on Sep. 27, 2019.

(51) Int. Cl.
*H04W 74/0833*    (2024.01)
*H04L 1/1812*    (2023.01)
(Continued)

(52) U.S. Cl.
CPC ....... *H04W 74/0841* (2013.01); *H04L 1/1812* (2013.01); *H04L 5/0053* (2013.01); *H04W 80/02* (2013.01)

(58) Field of Classification Search
CPC . H04W 74/0841; H04W 80/02; H04W 72/23; H04W 74/0833; H04W 74/004; H04L 1/1812; H04L 5/0053
(Continued)

(56) References Cited

U.S. PATENT DOCUMENTS

| 10,149,281 | B2 | 12/2018 | Papasakellariou et al. |
| 2002/0080797 | A1* | 6/2002 | Kim ...................... H04W 76/22 370/395.5 |

(Continued)

FOREIGN PATENT DOCUMENTS

| CN | 101507348 A | 8/2009 |
| CN | 109845380 A | 6/2019 |

(Continued)

OTHER PUBLICATIONS

Nokia et al: "Random access principles for new radio", 3GPP Draft; R1-1612299_RANDOM Access Principles for New Radio, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 (Year: 2016).*

(Continued)

*Primary Examiner* — Khaled M Kassim
*Assistant Examiner* — Oladiran Gideon Olaleye
(74) *Attorney, Agent, or Firm* — MARSHALL, GERSTEIN & BORUN LLP

(57) ABSTRACT

Granting access to a communication channel for several user devices by a base station includes receiving, from at least a first and second user device, at least a first request to access the communication channel and a second request to access the communication channel (1202), the first request including a first random access preamble and a first payload, and the second request including a second random access pre- (Continued)

amble and a second payload, and transmitting, to at least the first and second user devices, a response message including at least a first control channel resource assignment configuring at least a first control channel resource for the at least the first user device to transmit an acknowledgement of the response message (1208).

18 Claims, 16 Drawing Sheets

(51) Int. Cl.
*H04L 5/00* (2006.01)
*H04W 80/02* (2009.01)

(58) Field of Classification Search
USPC .......................................................... 370/329
See application file for complete search history.

(56) References Cited

U.S. PATENT DOCUMENTS

| | | | |
|---|---|---|---|
| 2010/0272066 A1* | 10/2010 | Wang | H04W 74/006 370/328 |
| 2013/0121259 A1 | 5/2013 | Mukherjee et al. | |
| 2017/0265231 A1 | 9/2017 | Lee et al. | |
| 2018/0115998 A1* | 4/2018 | Schreiber | H04B 7/0811 |
| 2019/0053211 A1 | 2/2019 | Ying et al. | |
| 2019/0150192 A1 | 5/2019 | He et al. | |
| 2019/0393992 A1 | 12/2019 | Xiong et al. | |
| 2020/0045650 A1 | 2/2020 | Suzuki et al. | |
| 2020/0107371 A1 | 4/2020 | Kunt et al. | |
| 2020/0137803 A1 | 4/2020 | Fakoorian et al. | |
| 2020/0170044 A1* | 5/2020 | Kim | H04W 72/0446 |

FOREIGN PATENT DOCUMENTS

| | | | | |
|---|---|---|---|---|
| JP | 2009524324 A | * | 1/2007 | .......... H04W 74/002 |
| JP | 5972955 B2 | * | 8/2016 | .......... H04W 72/121 |
| RU | 2463742 C2 | | 10/2012 | |
| WO | WO-2018/097497 A1 | | 5/2018 | |
| WO | WO-2018174656 A1 | * | 9/2018 | ............ H04W 72/14 |
| WO | WO-2018231012 A1 | * | 12/2018 | .......... H04B 7/0617 |
| WO | WO-2019029363 A1 | * | 2/2019 | .......... H04L 69/166 |
| WO | WO-2019/099278 A1 | | 5/2019 | |
| WO | WO-2020/083190 A1 | | 4/2020 | |

OTHER PUBLICATIONS

Nokia et al: "Random access principles for new radio", 3GPP Draft; R1-1612299_RANDOM Access Principles for New Radio, 3rd Generation Partnership Project (3GPP), Mobile Competence Centre; 650, Route Des Lucioles; F-06921 Sophia-Antipolis Cedex; France, vol. RAN WG1, No. Reno, USA (Year: 2016).*
First Examination Report for India Application No. 202147019625, dated Mar. 22, 2022.
CATT, "Consideration on 2-Step Rach," 3GPP Draft (2019).
International Search Report and Written Opinion for Application No. PCT/US2020/043186, dated Oct. 16, 2020.
International Search Report and Written Opinion for Application No. PCT/US2020/043187, dated Oct. 16, 2020.
Mediatek Inc., "2-Step RACH msgB Addressing and HARQ," 3GPP Draft (2018).
Nokia et al., "Random Access Principles for New Radio," 3GPP Draft (2016).
Samsung, "Fallback from 2 Step to 4 Step RACH," 3GPP Draft (2019).
Office Action for European Patent Application No. 20754487.5, dated Jul. 14, 2023.
First Office Action for Chinese Application No. 202080007578.3, dated Sep. 19, 2023.

* cited by examiner

ACCESSING A COMMUNICATION CHANNEL BY MULTIPLE USER DEVICES AT THE SAME TIME

CROSS-REFERENCE TO RELATED APPLICATIONS

This application claims priority to and the benefit of the filing date of (1) U.S. Provisional Patent Application No. 62/886,479 entitled "Accessing a Communication Channel by Multiple User Devices at the Same Time," filed on Aug. 14, 2019, and (2) U.S. Provisional Patent Application No. 62/907,166 entitled "Accessing a Communication Channel by Multiple User Devices at the Same Time," filed on Sep. 27, 2019, the entire disclosures of each of which are hereby expressly incorporated by reference.

FIELD OF THE DISCLOSURE

This disclosure relates to wireless communications and, more particularly, to synchronizing wireless communications in a channel access procedure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To synchronize communication over a radio interface in an unlicensed portion of the radio spectrum, a user device (referred to as user equipment, or "UE") and a base station can use a random access channel (RACH) procedure, for example. According to the four-step RACH procedure, (1) a user device sends a random access preamble to the base station ("Msg1"); (2) the base station sends a random access response (RAR) to the user device ("Msg2"); (3) the user device sends a scheduled transmission to the base station ("Msg3"); and (4) the base station sends a contention resolution to the user device ("Msg4"). Some standards recently introduced a two-step procedure which condenses steps (1) and (3) into a first step and steps (2) and (4) into a second step, such that (1) a user device sends a random access preamble and a scheduled transmission to the base station ("MsgA"); and (2) the base station sends an RAR and contention resolution to the user device ("MsgB").

The base station may send the MsgB in a medium access control (MAC) protocol data unit (PDU) using a hybrid automatic repeat request (HARQ) transmission scheme. If the user device receives and successfully decodes the HARQ transmission to obtain the MAC PDU, the user device transmits a HARQ acknowledgement (ACK) on a physical uplink shared channel (PUCCH) to the base station to acknowledge receipt of the HARQ transmission. Otherwise, the base station retransmits the HARQ transmission until the base station receives a HARQ ACK from the user device.

However, when multiple user devices send a MsgA in the two-step RACH procedure at the same time, the base station includes different MsgBs in the MAC PDU for each of the user devices. The HARQ transmission of the MAC PDU is sent on the same physical downlink shared channel (PDSCH) to each of the user devices, and because each of the user devices share the PDSCH, each of the user devices transmit HARQ ACKs on the same physical uplink control channel (PUCCH). Accordingly, the base station cannot determine which of the user devices received the MAC PDU from the HARQ ACK. As a result, if one of the user devices transmits a HARQ ACK and another user device does not receive and successfully decode the HARQ transmission, the base station may not be able to determine that the other user device did not receive or successfully decode the HARQ transmission. Thus, the base station may not retransmit the MsgB to the other user device, and the other user device may fail to successfully complete the two-step RACH procedure.

SUMMARY

Generally speaking, the techniques of this disclosure allow the base station to determine which user device transmitted a HARQ ACK to the base station in response to a HARQ transmission sent to several user devices, when the user devices transmitted respective communications during a channel access procedure to the base station at the same time. In some implementations, the channel access communications are RACH transmissions from the user devices, such as MsgAs each including a random access preamble and a data payload. In a response message to the user devices, which may include a HARQ transmission of a MAC PDU, the base station transmits different responses to each of the user devices, where each response is to a different MsgA (or a portion of a MsgA such as a random access preamble) transmitted by one of the user devices.

In some implementations, the MAC PDU of the response message includes a first response and a second response. The first response includes an identifier related to a first user device, such as a contention resolution identity which may be generated from content in the MsgA sent by the first user device. Still further, the first response to the first user device may include a control channel resource assignment configuring a control channel resource for the first user device to transmit an acknowledgement of the first response or the MAC PDU, such as a HARQ ACK. In some implementations, the control channel resource assignment is a PUCCH resource assignment. The first user device then attempts to decode the HARQ transmission to obtain the first response corresponding to the first user device. If the first user device receives and successfully decodes the HARQ transmission to obtain the MAC PDU, the first user device transmits a HARQ ACK to the base station on the control channel resource assigned to the first user device according to the control channel resource assignment included in the HARQ transmission or in the MAC PDU.

Moreover, if the base station 104 fails to decode the MsgA transmitted by the second user device but detects the random access preamble in the MsgA, the second response includes an identifier related to a second user device, such a random access preamble identity which may be generated from content in the random access preamble of the MsgA sent by the second user device. The second response does not include a contention resolution identity. Still further, the second response does not include a control channel resource assignment configuring a control channel resource for the second user device to transmit an acknowledgement of the second response or the MAC PDU, such as a HARQ ACK. Instead, the second response to the second user device may include a shared channel resource assignment configuring a shared channel resource for the second user device to transmit the data payload of the MsgA sent by the second user device as a Msg3 in the four-step RACH procedure. In some implementations, the shared channel resource assignment is a physical uplink shared channel (PUSCH) resource assignment. The second user device then attempts to decode the HARQ transmission to obtain the second response corresponding to the second user device. If the second user device receives and successfully decodes the HARQ transmission to obtain the MAC PDU, the second user device transmits the data payload (or a Msg3 in the four-step RACH procedure) to the base station on the shared channel resource assigned to the second user device according to the shared channel resource assignment included in the HARQ transmission or in the MAC PDU. The second user device does not transmit a HARQ ACK to the base station.

In some implementations, the base station generates a HARQ transmission of the MAC PDU including the first and second responses, respectively, for the first and second user devices. The base station includes a first identifier related to the first user device in the first response and includes a second identifier related to the second user device in the second response. In one example, the first identifier is a contention resolution identity which may be generated from content in a first MsgA sent by the first user device, and the second identifier is a random access preamble identity of a random access preamble in a second MsgA sent by the second user device. The base station sends the HARQ transmission to the first and second user devices over a PDSCH. The base station transmits a downlink control information (DCI) element which includes a first control channel resource assignment for the first user device to transmit a HARQ ACK, and a PDSCH for the HARQ transmission. The base station does not include a control channel resource assignment for the second user device to transmit a HARQ ACK in the DCI element. Instead, the base station includes in the second response a shared channel resource assignment for the second user device to transmit a data payload of the MsgA sent by the second user device (a Msg3). The first and second user devices receive the DCI element and receive the HARQ transmission on the PDSCH. If the first user device successfully obtains the MAC PDU from the HARQ transmission, the first user device transmits a HARQ ACK to the base station on the first control channel resource according to the first control channel resource assignment included in the DCI element. If the second user device successfully obtains the MAC PDU from the HARQ transmission, the second user device does not transmit a HARQ ACK to the base station and transmits the data payload of the second MsgA.

In other implementations, the base station generates a HARQ transmission of the MAC PDU including the first and second responses, respectively, for the first and second user devices. The base station includes a first identifier related to the first user device in the first response and includes a second identifier related to the second user device in the second response. In one example, the first identifier is a contention resolution identity which may be generated from content in a first MsgA sent by the first user device, and the second identifier is a contention resolution identity which may be generated from content in a second MsgA sent by the second user device. The base station sends the HARQ transmission to the first and second user devices over a PDSCH. The base station transmits a DCI element which includes a first control channel resource assignment for the first user device to transmit a HARQ ACK and a PDSCH for the HARQ transmission. The base station includes in the second response a second control channel resource assignment for the second user device to transmit a HARQ ACK. The first and second user devices receive the DCI element and receive the HARQ transmission on the PDSCH. If the first user device successfully obtains the MAC PDU from the HARQ transmission, the first user device transmits a HARQ ACK to the base station on a first control channel resource configured in the first control channel resource assignment included in the DCI element. If the second user device successfully obtains the MAC PDU from the HARQ transmission, the second user device transmit a HARQ ACK to the base station on a second control channel resource configured in the second control channel resource assignment included in the MAC PDU.

One example embodiment of these techniques is a method in a base station for granting access to a plurality of user devices to a communication channel. The method includes receiving, by processing hardware at the base station, at least a first request to access the communication channel from a first user device and a second request to access the communication channel from a second user device, the first request including a first random access preamble and a first data payload and the second request including a second random access preamble and a second data payload. The method further includes transmitting, by the processing hardware to the at least first and second user devices, a response message including at least a first channel resource assignment configuring a first channel resource for the first user device to transmit an acknowledgement of the response message or to transmit the first data payload, and a second channel resource assignment configuring a second channel resource for the second user device to transmit an acknowledgement of the response message or to transmit the second data payload. (a) The at least first and second channel resource assignments included in different portions of the response message, or (b) the at least first and second channel resource assignments having different types of channel resource assignments, the types of resource assignments including a control channel resource assignment and a shared channel resource assignment.

Another embodiment of these techniques is a base station comprising processing hardware configured to implement the method above.

Yet another embodiment of these techniques is a method in a first user device for requesting access to a communication channel. The method includes transmitting, by processing hardware at the first user device to a base station, a request to access the communication channel, the request includes a random access preamble and a data payload, and receiving, by the processing hardware, a response message to the request including at least a first channel resource assignment configuring a first channel resource for the first user device to transmit an acknowledgement of the response message or to transmit the data payload, and a second channel resource assignment configuring a second channel resource for a second user device to transmit an acknowledgement of the response message or to transmit a data payload. (a) The at least first and second channel resource assignments included in different portions of the response message, or (b) the at least first and second channel resource assignments having different types of channel resource assignments, the types of resource assignments including a control channel resource assignment and a shared channel resource assignment. The method further includes attempting to decode, by the processing hardware, the response message to identify the first channel resource assigned to the first user device.

Still another embodiment of these techniques is a user device comprising processing hardware configured to implement the method above.

DETAILED DESCRIPTION OF THE DRAWINGS

Figure 1:
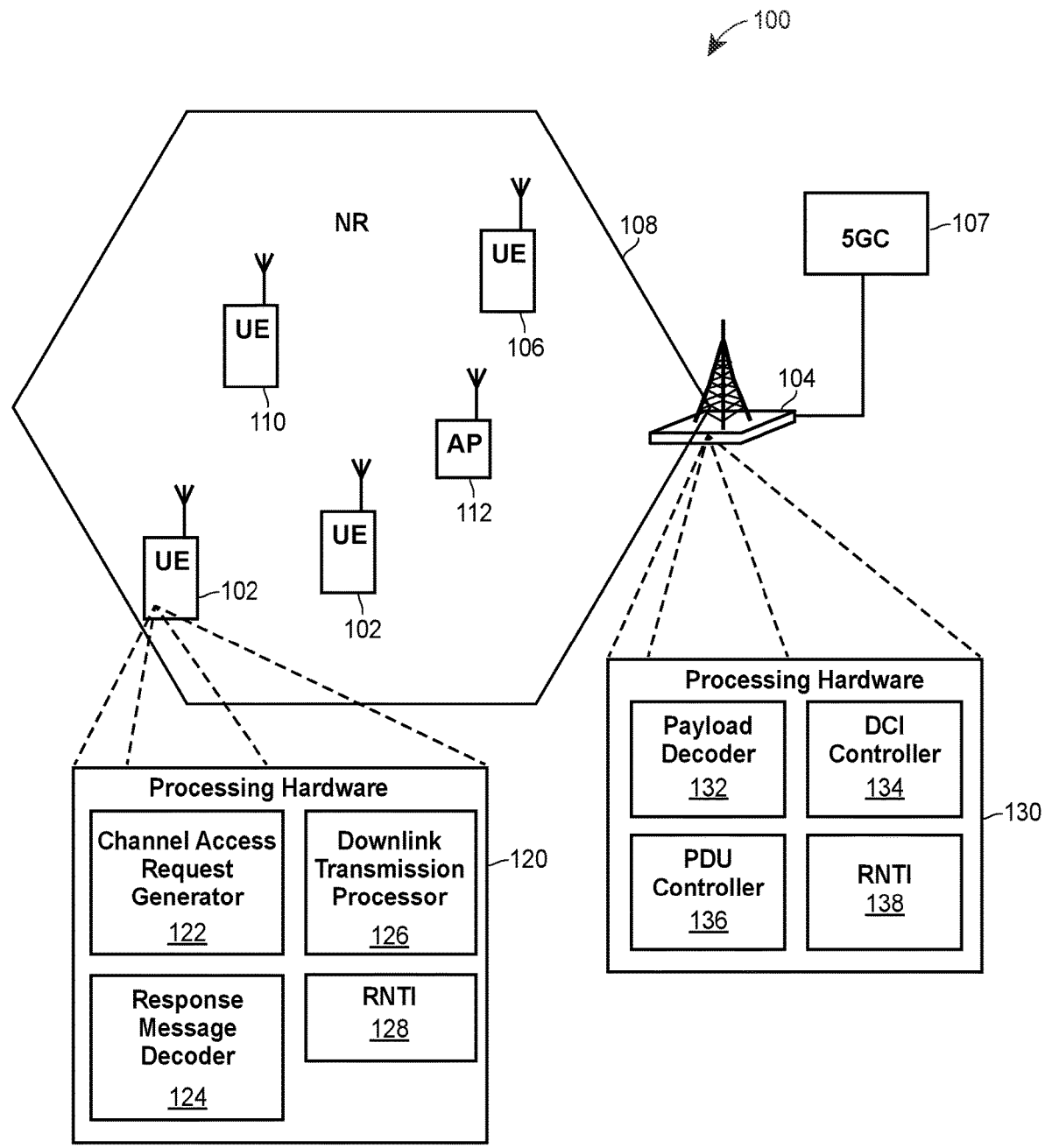
FIG. 1 is a block diagram of an example wireless communication network in which a base station and user devices can handle channel access procedures in accordance with the techniques of this disclosure.
Figure 2A:
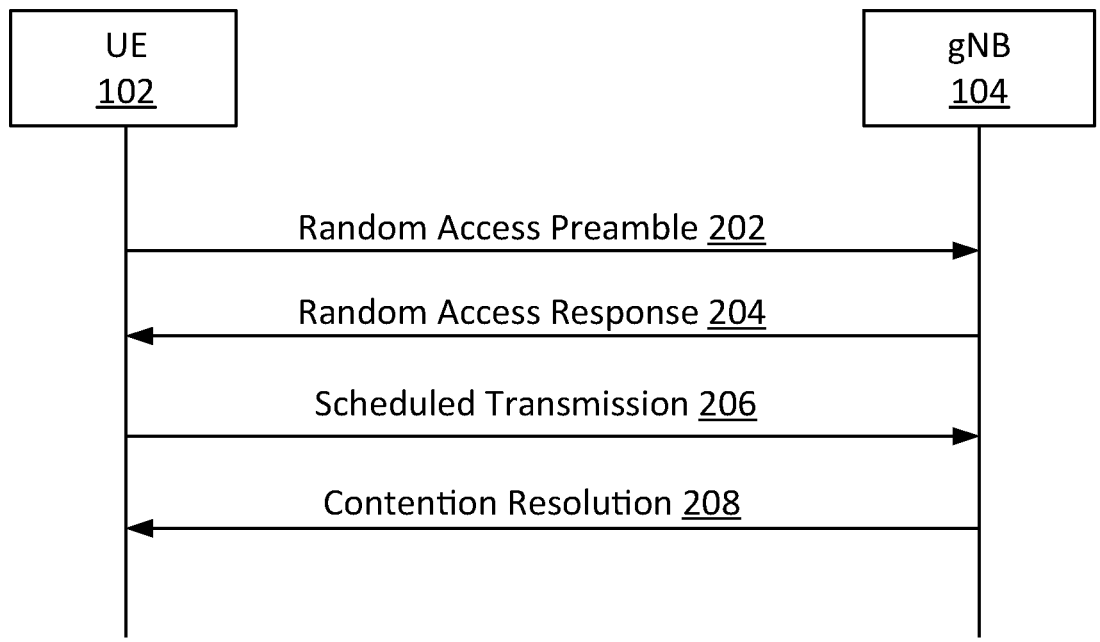
FIG. 2A is a messaging diagram of an example four-step RACH procedure.
Figure 2B:
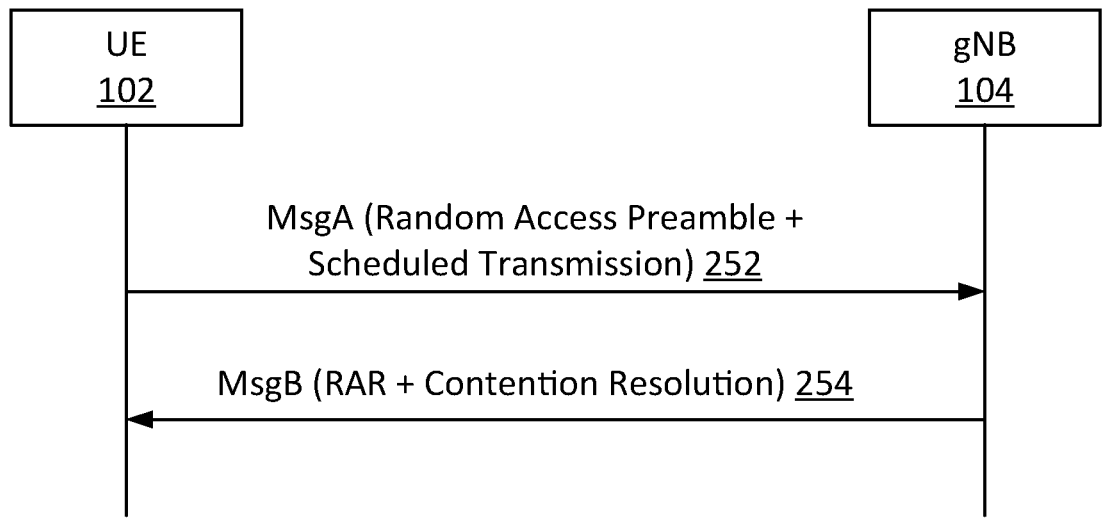
FIG. 2B is a messaging diagram of an example two-step RACH procedure.

FIG. 1 depicts an example wireless communication network 100 in which devices such as base stations and user devices (also referred to user equipment, or UEs) communicate using channel access procedures.

The wireless communication network 100 in an example configuration includes multiple UEs 102, 106, which can be any suitable device capable of wireless communications (as further discussed below). The wireless communication network 100 further includes a 5G New Radio (NR) base station 104 connected to a core network (CN) 107 of CN type 5GC. The 5G NR base station 104 accordingly operates as a g Node B (gNB). In other implementations, however, the wireless communication network 100 can include one or more base stations that operate according to radio access technologies (RATs) of types other than NR, and these base stations can be connected to CNs of other CN types, or operated in a standalone mode without a connection to any CN. Accordingly, devices operating using any RAT can implement the techniques of this disclosure when attempting to obtain radio resources in an unlicensed spectrum.

The base station 104 covers a 5G NR cell 108 in which UEs can utilize licensed spectrum or unlicensed spectrum as well as portions of the radio spectrum allocated specifically to the service provider that operates the base station 104 and the core network 107. When receiving data from, and transmitting data to, the base station 104 using the 5G NR air interface on the unlicensed spectrum (i.e., NR-unlicensed (NR-U)), the UEs 102, 106 may share the unlicensed spectrum with other devices. For example, a UE 110 can be a subscriber of the service provider that operates the base station 104 and the core network 107, and thus can communicate with the base station 104. In another scenario, the UE 110 is a subscriber of another service provider that supports the NR-U and communicates with a base station other than the base station 104 (not shown to avoid clutter). In this scenario, a user operates the base station 104 and connects the base station 104 to a data network of an Internet service provider (ISP). The base station 104 in this case operates similar to a WiFi access point (AP) but utilizes the NR-U instead of one of IEEE 802.11 standards to communicate with the UEs. Further, an AP 112 can utilize portions of the radio spectrum as the NR-U when operating in a wireless local area network (WLAN) according to one of IEEE 802.11 standards.

In general, the wireless communication network 100 can include any number of base stations, and each of the base stations can cover one, two, three, or any other suitable number of cells. Additionally, the wireless communication network 100 can include any number of UEs 102, 106.

The UE 102, 106 is equipped with processing hardware 120 that can include one or more general-purpose processors (e.g., CPUs) and a non-transitory computer-readable memory storing instructions that the one or more general-purpose processors execute. Additionally or alternatively, the processing hardware 120 can include special-purpose processing units. The processing hardware 120 in an example implementation includes a channel access request generator 122, a response message decoder 124, and a downlink transmission processor 126. In some implementations, the UE 102, 106 can be an integrated access backhaul (IAB) node or a relay node.

The channel access request generator 122 may generate a MsgA having a random access preamble and a payload. In some implementations, the payload in the MsgA is a MAC PDU. The payload may include an uplink common control channel (CCCH) message having an RRC request message (e.g., an RRC Setup Request message, an RRC Resume Request message, an RRC Reestablishment Request message, or an RRC Early Data Request message). In other implementations, the payload may include an Internet Protocol (IP) packet. The MAC PDU may include at least one of an RRC request message, a MAC control element (CE), a radio link control (RLC) PDU, a Packet Data Convergence Protocol (PDCP) PDU and a Service Data Adaptation Protocol (SDAP) PDU. The base station 104 may attempt to decode the MsgAs and in some scenarios, may receive and successfully decode the random access preamble and payload for at least one of the MsgAs. In this scenario, the base station 104 may follow the two-step RACH procedure and transmit a successful RAR to the corresponding UE within a MAC PDU (also referred to herein as a "MsgB") of a response message. In other scenarios, the base station 104 may not receive the payload or may not successfully decode the payload for at least one of the MsgAs. In this scenario, the base station 104 may follow the four-step RACH procedure and transmit a fallback RAR or Msg2 to the corresponding UE within a MAC PDU of the response message. More specifically, the base station 104 may provide a response message to the MsgAs including a DCI on a physical downlink control channel (PDCCH), and a MAC PDU in a physical data shared channel (PDSCH). The MAC PDU may be included in a HARQ transmission. The MAC PDU may include at least two responses, such as a response for each of the two UEs 102, 106 that provided a MsgA to the base station 104 at the same time. The first response for the UE 102 may be a successful RAR in the two-step RACH procedure and may include at least one of a temporary cell-radio network temporary identifier (C-RNTI), a contention resolution identity, and a timing advanced command. The second response for the UE 106 may be a Msg2 in the four-step RACH procedure and may include at least one of a temporary C-RNTI, a random access preamble identity associated with a random access preamble of the MsgA transmitted by the UE 106, and a timing advanced command. The second response does not include a contention resolution identity. In some cases, the first response may include a PDU within the MAC PDU, and the second response does not include a PDU within the MAC PDU. The PDU may be a packet data convergence protocol (PDCP) PDU, a radio link control (RLC) PDU, a radio resource control (RRC) PDU, a CCCH message, a Dedicated Control Channel (DCCH), or an RRC message. In other cases, the first response may not include the PDU.

Additionally, the response message may include a PUCCH resource assignment configuring a PUCCH resource for the UE 102 to transmit a HARQ ACK in response to successfully decoding the MAC PDU in the HARQ transmission. The PUCCH resource assignment may be included in the DCI element or the first response within the MAC PDU of the response message. The response message may not include a PUCCH resource assignment for the UE 106 to transmit a HARQ ACK in response to successfully decoding the MAC PDU in the HARQ transmission. Instead, the response message may include a PUSCH resource assignment configuring a PUSCH resource for the UE 106 to transmit the data payload of the MsgA sent by the UE 106 as a Msg3 in the four-step RACH procedure. The PUSCH resource assignment may be included in the second response within the MAC PDU of the response message. Then the response message decoder 124 may decode the MAC PDU within the response message by obtaining the DCI. When the response message decoder 124 successfully obtains the DCI, the downlink transmission processor 126 can receive a PDSCH transmission including the MAC PDU according to the DCI. The response message decoder 124 may then attempt to decode the MAC PDU to identify a response including a contention resolution identity that corresponds to the particular UE 102, 106. For example, the contention resolution identity may be associated with or generated from content in the payload of the MsgA sent by the particular UE 102, 106. If the response message decoder 124 of the UE 102 successfully decodes the MAC PDU and identifies a first response having a contention resolution identity that corresponds to the UE 102, the UE 102 may transmit a HARQ ACK to the base station 104 on the PUCCH resource assigned to the UE 102 in the first response. If the response message decoder 124 of the UE 106 successfully decodes the MAC PDU and identifies the second response having no contention resolution identity that corresponds to the UE 106, the UE 106 does not transmit a HARQ ACK to the base station 104. Additionally, if the response message decoder 124 of the UE 106 successfully decodes the MAC PDU and identifies the second response having a random access preamble identity that corresponds to a random access preamble of the MsgA transmitted by the UE 106, the UE 106 does not transmit a HARQ ACK to the base station 104. Instead, the UE 106 transmits the data payload of the MsgA sent by the UE 106 as a Msg3 in the four-step RACH procedure to the base station 104. The UE 106 may transmit the data payload to the base station 104 in a HARQ transmission on a PUSCH resource. If the response message decoder 124 is unable to decode the MAC PDU, the UE 102, 106 may transmit a HARQ negative acknowledgement (NACK) to the base station 104 or may not transmit any HARQ feedback to the base station 104.

In some implementations, the base station 104 may further include a third response (e.g., a successful RAR) for a third UE (not shown in FIG. 1) other than the UEs 102, 106 in the MAC PDU. In this case, the response message may include a PUCCH resource assignment configuring a PUCCH resource for the third UE to transmit a HARQ ACK in response to successfully decoding the MAC PDU in the HARQ transmission. The PUCCH resource assignment may be included in the DCI element or the first response within the MAC PDU of the response message.

The memory of the processing hardware 120 also can store an RNTI 128 of the UE 102, 106. The RNTI can be for example a cell RNTI (C-RNTI), a temporary C-RNTI, a random access RNTI (RA-RNTI), a system information RNTI (SI-RNTI), a paging RNTI (P-RNTI), a configured scheduling RNTI (CS-RNTI), a MsgB-RNTI, etc. The UE 102, 106 can attempt to decode a PDCCH using the RNTI 128. The base station 104 may transmit to the UE 102, 106 a MAC PDU with a HARQ transmission in a PDSCH. The MAC PDUs may include different responses for different UEs (e.g., successful RAR(s) and/or fallback RAR(s)). The UE 102, 106 can store multiple RNTIs of different types and utilize these RNTIs when processing different messages as discussed below.

Processing hardware 130 of the base station 104 also can include one or more general-purpose processors such as CPUs and a non-transitory computer-readable memory storing instructions that the one or more general-purpose processors execute. Additionally or alternatively, the processing hardware 130 can include special-purpose processing units. The processing hardware in an example implementation includes a payload decoder 132, a DCI controller 134, a PDU controller 136, and an RNTI generator 138. In other implementations, the processing hardware 130 includes only some of the units 132-138.

In operation, the payload decoder 132 decodes the payloads included in the MsgAs from the UEs 102, 106. The DCI controller 134 generates a DCI to be transmitted to the UE 102, 106 via a PDCCH. In some implementations, the DCI includes a PUCCH resource assignment configuring a PUCCH resource for the UE 102 to transmit a HARQ ACK on the PUCCH resource in response to successfully decoding the MAC PDU in the HARQ transmission and identifying the first response. In some implementations, the DCI includes a PDSCH assignment configuring a PDSCH where the HARQ transmission is to be transmitted. The DCI may not include a PUCCH resource assignment configuring a PUCCH resource for the UE 106 to transmit a HARQ ACK on the PUCCH resource in response to successfully decoding the MAC PDU in the HARQ transmission and identifying the second response.

The PDU controller 136 generates a MAC PDU to be transmitted to the UEs 102, 106 via a PDSCH. In some implementations, the generated MAC PDU includes a PUCCH resource assignment configuring a PUCCH resource for the UE 102 to transmit a HARQ ACK in response to successfully decoding the MAC PDU in the HARQ transmission. The generated MAC PDU may not include a PUCCH resource assignment configuring a PUCCH resource for the UE 106 to transmit a HARQ ACK in response to successfully decoding the MAC PDU in the HARQ transmission. Instead, the generated MAC PDU may include a PUSCH resource assignment configuring a PUSCH resource for the UE 106 to transmit the data payload of the MsgA sent by the UE 106 as a Msg3 in the four-step RACH procedure. The MAC PDU may also include a first response corresponding to the UE 102 and a second response corresponding to the UE 106. The first response may include a contention resolution identity corresponding to the UE 102, so that the UE 102 may identify the first response intended for the UE 102. The second response may not include a contention resolution identity corresponding to the UE 106 and may include a random access preamble identity of the MsgA transmitted by the UE 106, so that the UE 106 may identify the second response intended for the UE 106. In other implementations, the generated MAC PDU does not include a PUCCH resource assignment configuring a PUCCH resource for the UE 102 to transmit a HARQ ACK in response to successfully decoding the MAC PDU in the HARQ transmission. Instead, the PUCCH resource assignment configuring a PUCCH resource for the UE 102 to transmit a HARQ ACK in response to successfully decoding the MAC PDU in the HARQ transmission is included in the DCI element. The generated MAC PDU includes a PUCCH resource assignment configuring a PUCCH resource for the UE 106 to transmit a HARQ ACK in response to successfully decoding the MAC PDU in the HARQ transmission. In yet other implementations, the generated MAC PDU does not include a PUCCH resource assignment configuring a PUCCH resource for the UE 102 to transmit a HARQ ACK in response to successfully decoding the MAC PDU in the HARQ transmission. Instead, the PUCCH resource assignment configuring a PUCCH resource for the UE 102 to transmit a HARQ ACK in response to successfully decoding the MAC PDU in the HARQ transmission is included in the DCI element. The generated MAC PDU includes a PUSCH resource assignment configuring a PUSCH resource for the UE 106 to transmit the data payload of the MsgA sent by the UE 106 as a Msg3 in the four-step RACH procedure.

In further implementations, the PDU controller 136 may include responses for the UEs 102, 106 in an order in the MAC PDU depending on different types of the responses (e.g., a successful RAR or a fallback RAR) and/or different types of corresponding channel resource assignments (e.g., PUCCH or PUSCH). The PDU controller 136 places the successful RARs for the UEs which transmitted MsgAs that were successfully decoded in a first position in the MAC PDU before the fallback RARs for the UEs which transmitted MsgAs that were not successfully decoded. The fallback RARs are placed in a second position in the MAC PDU after the successful RARs. More generally, the PDU controller 136 places at least one successful RAR for at least one first UE and at least one fallback RAR for at least one second UE in a MAC PDU to be transmitted to the at least one first and second UEs so that no successful RAR is inserted between two fallback RARs and no fallback RAR is inserted between two successful RARs in the MAC PDU. In one implementation, the successful RAR(s) is/are placed on the left side of the MAC PDU and the fallback RAR(s) is/are placed on the right side of the MAC PDU so that the first UE(s) can quickly identify corresponding successful RAR(s) while parsing the MAC PDU, and have more time to prepare transmission of a HARQ ACK. An example format of the MAC PDU is illustrated in Table 1 below.

TABLE 1

MAC PDU having successful RARs
positioned to the left of fallback RARs

| Successful RAR for UE 1 | Successful RAR for UE 2 | Fallback RAR for UE 3 | Fallback RAR for UE 4 |
|---|---|---|---|

In additional implementations, the PDU controller 136 may place the successful RAR(s) and the fallback RAR(s) in a MAC PDU without considering the order as described above. Therefore, a successful RAR may be inserted between two fallback RARs or a fallback RAR may be inserted between two successful RARs in the MAC PDU. For example, the base station 104 generates a MAC PDU including a first response (e.g., a successful RAR) for UE 102, a second response (e.g., a fallback RAR) for UE 106 and a third response (e.g., a successful RAR) for a third UE, sequentially. The base station 104 includes a first PUCCH resource assignment and a second PUCCH resource assignment in a DCI element scheduling the MAC PDU. If the UE 102 receives the DCI and the MAC PDU, the UE 102 identifies that the first PUCCH resource assignment is intended for the UE 102 since the UE 102 identifies that the first response includes a contention resolution identity associated with/generated from content in a payload of the MsgA 1 and is in the first location in sequence in the MAC PDU. If the UE 106 receives the DCI and the MAC PDU, the UE 106 does not identify a PUCCH resource assignment intended for the UE 106 since the second response does not include a contention resolution identity associated with/generated from content in a payload of the MsgA 2. If the third UE receives the DCI and the MAC PDU, the third UE identifies that the second PUCCH resource assignment is intended for the third UE since the third UE identifies that a third response includes a contention resolution identity associated with/generated from content in a payload of the MsgA sent by the third UE (e.g., a MsgA 3) and is in the third location in sequence in the MAC PDU, but in the second location in sequence in the MAC PDU when skipping the location(s) of fallback RAR(s) and only considering the location(s) of successful RAR(s)). In some implementations, the DCI element may include information for the UE 102 to derive the first PUCCH assignment and for the third UE to derive the second PUCCH assignment. An example format of a portion of a DCI element is illustrated in Table 2 below. An example format of the MAC PDU is illustrated in Table 3 below.

TABLE 3

DCI element including PUCCH resource assignments

| First PUCCH assignment | Second PUCCH assignment |
|---|---|

TABLE 3

MAC PDU having successful RARs and
fallback RARs in no particular order

| Successful RAR for UE 102 | Fallback RAR for UE 106 | Successful RAR for the third UE |
|---|---|---|

In some implementations, the base station 104 includes a contention resolution identity for a particular UE 102, 106 if the base station 104 successfully decodes the MsgA transmitted by the particular UE 102, 106. The base station 104 does not include a contention resolution identity for a particular UE 102, 106 if the base station 104 fails to decode the MsgA transmitted by the particular UE 102, 106. The base station 104 includes a random access preamble identity of the random access preamble in the MsgA transmitted by a particular UE 102, 106 if the base station 104 fails to decode the MsgA transmitted by the particular UE 102, 106 but detects the random access preamble in the MsgA. The base station 104 generates the first response for the UE 102 having the contention resolution identity if the base station 104 successfully decodes the MsgA transmitted by the UE 102. The base station 104 generates the second response for the UE 106 having the random access preamble identity if the base station 104 fails to decode the MsgA transmitted by the UE 102 but detects the random access preamble in the MsgA.

In other implementations, the base station 104 includes a contention resolution identity for only one particular UEs 102, 106 if the base station 104 successfully decodes the MsgA transmitted by the particular UE 102, 106. The base station 104 includes a random access preamble identity of the random access preamble in the MsgA transmitted by the other particular UEs 102, 106. The base station 104 generates the first response for the UE 102 having the contention resolution identity if the base station 104 successfully decodes the MsgA transmitted by the UE 102. The base station 104 generates the second response for the UE 106 having the random access preamble identity. The base station 104 may generate the first and second responses in this manner, because the base station 104 is prohibited from including two PDUs in a MAC PDU for the UEs 102, 106.

The RNTI generator 138 generates an RNTI which is used to scramble a cyclic redundancy check (CRC) of the DCI to be transmitted to the UE 102, 106 via a PDCCH.

As described above, during a channel access procedure, several UEs 102, 106 transmit MsgAs to the base station 104 at the same time where each of the MsgAs includes a random access preamble and a payload. The base station 104 then generates a response message which may include a HARQ transmission having a MAC PDU with several responses each corresponding to a different one of the UEs 102, 106 that transmitted the MsgA. Each response may include an identifier related to a particular UE, such as a contention resolution identity which may be generated from content in the MsgA sent by the corresponding UE, or a random access preamble identity associated with a random access preamble identity in the MsgA sent by the corresponding UE. Each UE 102, 106 attempts to decode the MAC PDU included in the HARQ transmission to identify a response corresponding to the particular UE 102, 106 based on the contention resolution identity or the random access preamble identity in the response. If the UE 102, 106 successfully decodes the MAC PDU and identifies its corresponding contention resolution identity, the UE 102, 106 may transmit a HARQ ACK to the base station 104 on the PUCCH resource assigned to the UE 102, 106 in the MAC PDU or in the DCI of the response message. If the UE 102, 106 successfully decodes the MAC PDU and does not identify a contention resolution identity corresponding to the UE 102, 106, the UE 102, 106 may not transmit a HARQ ACK to the base station 104. If the UE 102, 106 identifies a random access preamble identity corresponding to the UE 102, 106 instead, the UE 102, 106 may transmit a data payload of the MsgA sent by the UE 106 as a Msg3 in the four-step RACH procedure on the PUSCH resource assigned to the UE 102, 106 in the MAC PDU of the response message. On the other hand, if the UE 102, 106 is unable to decode the MAC PDU, the UE 102, 106 may transmit a HARQ NACK to the base station 104 or may not send a transmission to the base station 104.

While the messaging diagrams in FIGS. 3-11, described in more detail below, include two UEs (UE 102 and UE 106), any number of UEs may transmit MsgAs to the base station 104 at the same time, and thus may receive a MAC PDU from the base station 104 including responses corresponding to each of the MsgAs. Additionally, while the MsgAs may be transmitted simultaneously, the MsgAs may be transmitted on different frequencies or the same frequencies. In some implementations, the base station 104 transmits the UE 102 a first response in the MAC PDU to respond to a MsgA transmitted by the UE 102 and transmits the UE 106 a second response in the MAC PDU to respond to a random access preamble of a MsgA transmitted by the UE 106. In some cases, the first response may be a successful random access response and the second response may be a fallback random access response (e.g., from the two-step RACH procedure to the four-step RACH procedure).

Figure 3:
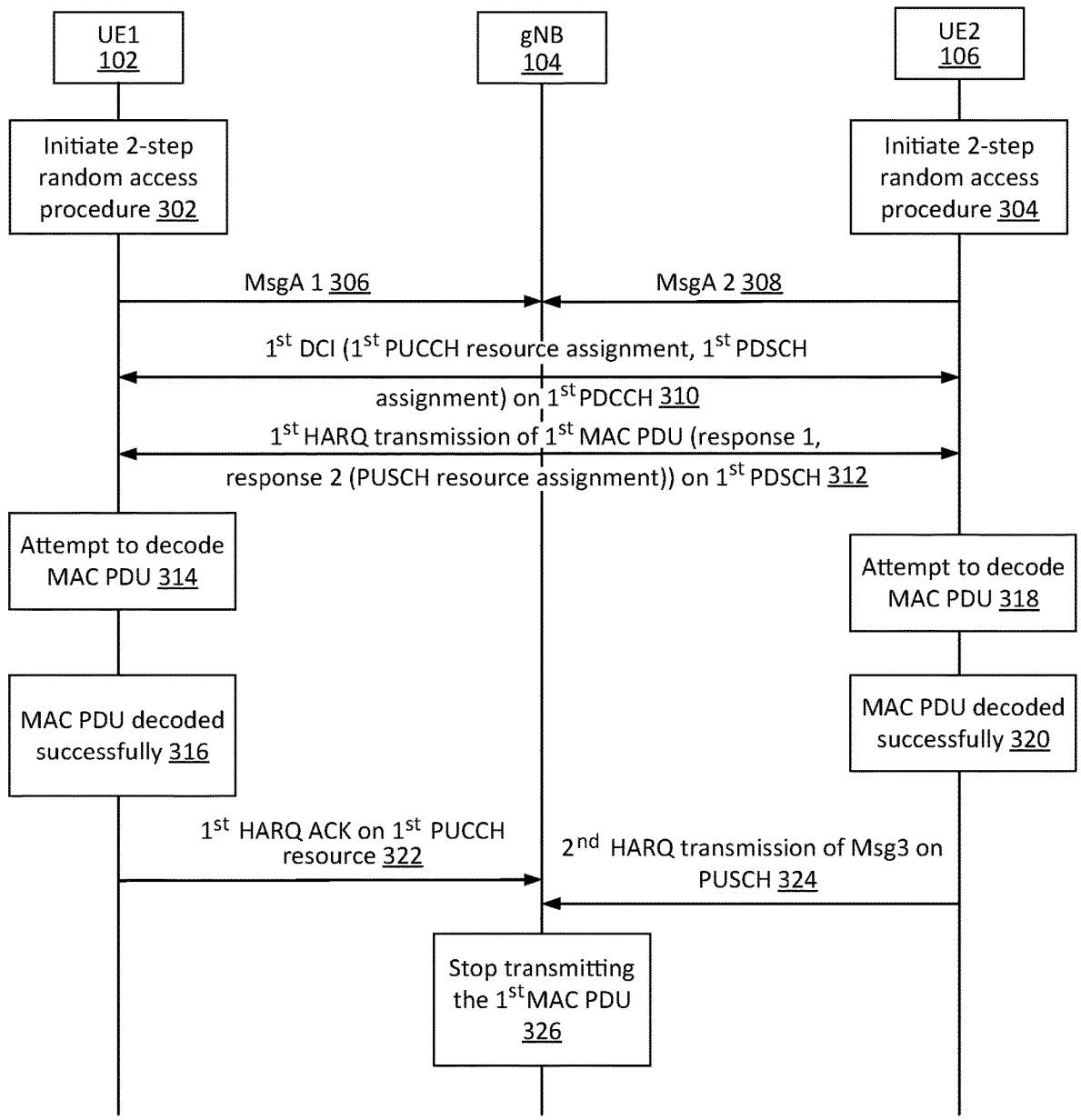
FIG. 3 is a messaging diagram of an example procedure for providing a control channel resource assignment via a DCI element to a first user device for transmitting an acknowledgement of a MAC PDU from the base station and providing a shared channel resource assignment via the MAC PDU to a second user device for transmitting a data payload.

In some implementations, the base station may transmit a PUCCH resource assignment to the UE 102 via the MAC PDU and does not transmit a PUCCH resource assignment to the UE 106. FIG. 3 depicts a messaging diagram of an example procedure for providing a control channel resource assignment via a DCI element to the UE 102 for transmitting an acknowledgement of a response message from the base station 104 without providing a control channel resource assignment to the UE 106 to transmit an acknowledgement of the response message, and instead providing a shared channel resource assignment to the UE 106 to transmit a data payload of the MsgA sent by the UE 106. As shown in FIG. 3, UE 102 and UE 106 both initiate 302, 304 a two-step RACH procedure. In particular, a base station (e.g., gNB) 104 receives 306, 308 a MsgA 1 from UE 102 and a random access preamble in MsgA 2 from UE 106. The base station 104 generates a first response (response 1) (e.g., a MsgB) to respond to the MsgA 1 and generates a second response (response 2) (e.g., a Msg2) to respond to a random access preamble in the MsgA 2. To generate the response 1, the base station 104 generates a first PUCCH resource assignment to respond to the response 1. To generate the response 2, the base station 104 generates a first PUSCH resource assignment or uplink grant different from the first PUCCH resource assignment, and includes the first PUSCH resource assignment in the response 2. The first PUCCH resource assignment configures a first PUCCH resource and the first PUSCH resource assignment configures a first PUSCH resource. The first PUCCH resource and the first PUSCH resource may be different or may not overlap. In one example, the first PUCCH resource and the first PUSCH resource can be on different OFDM symbols, different slots, different subcarriers or different physical resource blocks. The OFDM can be a Discrete Fourier Transform-Spread (DFT-S-OFDM) or a cyclic-prefix (CP) OFDM. The base station 104 includes the response 1 and the response 2 in a first MAC PDU and generates a first HARQ transmission of the first MAC PDU. The base station 104 generates a first DCI element including the first PUCCH resource assignment and a first PDSCH assignment configuring a first PDSCH. The base station 104 transmits 310 the first DCI element (with a CRC scrambled by a RNTI) on a first PDCCH and the first DCI element configures (i.e., assigns) a first PDSCH to the UEs. The base station 104 transmits 312 a first HARQ transmission of the first MAC PDU on the first PDSCH.

To transmit a MAC PDU including several responses for several UEs, the base station 104 generates a first PUCCH resource assignment and includes the first PUCCH resource assignment in the DCI element. The first PUCCH resource assignment is associated with a response 1 of the several responses. In some implementations, the base station 104 includes the first PUCCH resource assignment in the DCI element according to a format of the DCI element and a format of the MAC PDU. An association between a PUCCH resource assignment and its corresponding response of the several responses may be specified in a 3GPP specification.

The UE 102 and the UE 106 perform PDCCH monitoring to receive the first DCI element on the first PDCCH. If the UE 102 receives the first MAC PDU on the first PDSCH, the UE 102 identifies the first PUCCH resource assignment from the response 1 in the first MAC PDU. The UE 102 transmits 322 a first HARQ ACK according to the first PUCCH resource assignment. If the base station 104 receives the first HARQ ACK on the first PUCCH resource, the base station 104 determines the UE 102 received the response 1 or the first MAC PDU. If the UE 102 does not receive the first MAC PDU on the first PDSCH, the UE 102 does not transmit the first HARQ ACK on the first PUCCH resource. In this case, the base station 104 does not receive the first HARQ ACK. The base station 104 determines the UE 102 does not receive the response 1 or the first MAC PDU due to not receiving a HARQ ACK on the first PUCCH resource.

Likewise, if the UE 106 receives the first MAC PDU on the first PDSCH, the UE 106 identifies the first PUSCH resource assignment from the response 2 in the first MAC PDU. The UE 106 transmits 326 a Msg3 on the first PUSCH resource configured in the first PUSCH resource assignment. In some implementations, the data payload of the MsgA 2 may be a first HARQ transmission of an uplink MAC PDU. The UE 106 generates a second HARQ transmission of the Msg3. In one implementation, the uplink MAC PDU is same as the Msg3. The first and second HARQ transmissions may be the same or different. In one example, the first and second HARQ transmissions are associated with the same redundancy version (e.g., 0). In another example, the first and second HARQ transmissions are associated with different redundancy versions. For example, the first HARQ transmission is associated with a first redundancy version (e.g., 0) and the second HARQ transmission is associated with a second redundancy version (e.g., 2). In another implementation, the uplink MAC PDU is different from the Msg3. For example, the uplink MAC PDU and the Msg3 include different upper layer PDUs, different MAC control elements (CEs) or the same MAC CEs with different values. The first and second HARQ transmissions can be associated with the same redundancy version (e.g., 0). If the base station 104 receives the Msg3 on the first PUSCH, the base station 104 determines the UE 106 received the response 2. If the UE 106 does not receive the first MAC PDU on the first PDSCH, the UE 106 does not transmit the Msg3 on the first PUSCH. In this case, the base station 104 does not receive the Msg3. The base station 104 determines the UE 106 does not receive the response 2 or the first MAC PDU due to not receiving a Msg3 on the first PUSCH.

The base station 104 can determine whether the UE 102 received the response 1 or the first MAC PDU according to whether a HARQ ACK is received from the UE 102 on the first PUCCH resource. The base station 104 can determine whether the UE 106 received the response 2 or the first MAC PDU according to whether a Msg3 is received from the UE 106 on the first PUSCH.

In some implementations, the base station 104 transmits the first MAC PDU using a HARQ transmission scheme. For example, the base station 104 generates a first HARQ transmission of the first MAC PDU and transmits the first HARQ transmission on the first PDSCH to the UE 102 and UE 106. The UE 102 receives the first HARQ transmission and attempts to decode 314 the first HARQ transmission to obtain the first MAC PDU. If the UE 102 successfully decodes 316 the first HARQ transmission to obtain the first MAC PDU and identifies the response 1, the UE 102 transmits the first HARQ ACK 322 on the first PUCCH resource included in the response 1 to the base station 104 to acknowledge reception of the first MAC PDU or the response 1. The UE 102 may identify the response 1 according to a contention resolution identity in the response 1. The contention resolution identity may be associated with/generated from content in a payload of the MsgA 1. For example, if the UE 102 identifies the contention resolution identity in the response 1 is generated from the content in the payload of the MsgA 1, the UE 102 identifies the response 1 as a response intended for the UE 102.

Likewise, the UE 106 receives the first HARQ transmission and attempts to decode 318 the first HARQ transmission to obtain the first MAC PDU. If the UE 106 successfully decodes 320 the first HARQ transmission to obtain the first MAC PDU and identifies the response 2, the UE 106 transmits 324 the Msg3 on the PUSCH resource included in the response 2 to the base station 104. In some implementations, the Msg3 is a HARQ transmission associated with a redundancy version (e.g., 0). The UE 106 may identify the response 2 according to a random access preamble identity in the response 2. The random access preamble identity is associated with a random access preamble in the MsgA 2. For example, if the UE 106 identifies the random access preamble identity in the response 2 is associated with the random access preamble in the MsgA 2 or is the random access preamble identity of the random access preamble in the MsgA 2, the UE 106 identifies the response 2 as a response intended for the UE 106. In response to receiving a HARQ ACK from the UE 102, the base station 104 then stops transmitting 326 the first MAC PDU. In some implementations, the UE 102 and the UE 106 may transmit the HARQ ACK and the Msg3 at the same time (e.g., with different spatial assignments). In other implementations, the UE 102 and the UE 106 may transmit the HARQ ACK and the Msg3 at different time slots or different OFDM symbols.

In some implementations, the response 1 is a successful RAR from the two-step RACH procedure and the response 2 is a fallback RAR from the four-step RACH procedure. In other implementations, the response 1 includes at least one of a temporary C-RNTI, the contention resolution identity associated with or generated from content in the payload of the MsgA 1, and a timing advanced command. The response 1 may or may not include a random access preamble identity that corresponds to a random access preamble of the MsgA 1. The response 2 includes at least one of a temporary C-RNTI, the random access preamble identity that corresponds to the random access preamble of the MsgA 2, a timing advance command and the PUSCH resource assignment (i.e., uplink grant). The response 2 does not include a contention resolution identity.

While the messaging diagram of FIG. 3 includes two UEs 102, 106, this is not intended to be limiting and the base station 104 may receive MsgAs at the same time from three UEs, four UEs, or any suitable number of UEs. The base station 104 may then include responses to each of the UEs in the MAC PDU. For the UEs having MsgAs that the base station 104 successfully decodes, the base station 104 includes control channel resource assignments, such as PUCCH resource assignments in the DCI element for the corresponding UEs to acknowledge the respective responses. For the UEs having MsgAs that the base station 104 fails to decode but detects a random access preamble, the base station 104 includes shared channel resource assignments, such as PUSCH resource assignments in the MAC PDU for the corresponding UEs to transmit Msg3s.

Figure 4:
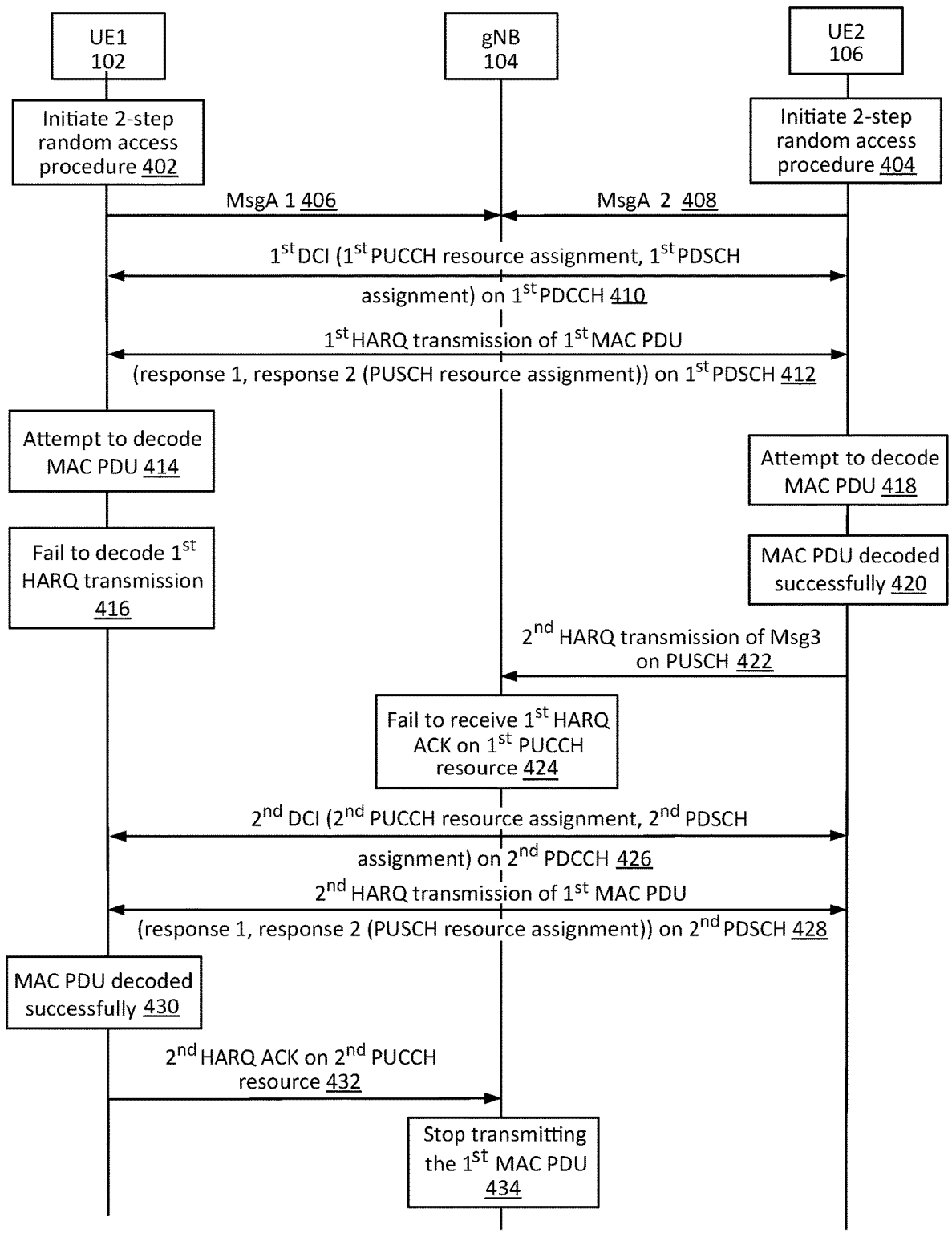
FIG. 4 is a messaging diagram of an example procedure for providing resource assignments to user devices for transmitting acknowledgements of a response message from the base station and for transmitting data payloads to the base station and retransmitting the response message when one of the user devices does not transmit an acknowledgement or data payload.

In the example scenario shown in the messaging diagram of FIG. 3, the UE 102 successfully decodes the MAC PDU transmitted by the base station 104 and transmits a HARQ ACK in response to the HARQ transmission from the base station, and the UE 106 successfully decodes the MAC PDU and transmits a Msg3 using a PUSCH resource assignment in the MAC PDU transmitted by the base station 104. FIG. 4 illustrates an example scenario where the UE 102 does not successfully decode the MAC PDU transmitted by the base station 104. More specifically, FIG. 4 depicts a messaging diagram of an example procedure for providing a resource assignment to the UE 102 for transmitting an acknowledgement of a response message from the base station 104 and retransmitting the response message when the base station 104 does not receive an acknowledgement. While many of the steps in the messaging diagram of FIG. 4 are similar to the steps in the messaging diagram of FIG. 3, the differences are described in more detail below.

In any event, the UE 102 either fails 416 to decode the first HARQ transmission or does not receive the first HARQ transmission and accordingly, does not transmit the first HARQ ACK to the base station 104. As a result, the base station 104 does not receive 424 the first HARQ ACK on the first PUCCH resource, and in some implementations may generate a second HARQ transmission of the first MAC PDU and transmit 428 the second HARQ transmission on a second PDSCH to the UE 102. The base station 104 transmits 426 a second DCI element configuring the second PDSCH on a second PDCCH. The UE 102 receives the second DCI element on the second PDCCH and receives the second HARQ transmission on the second PDSCH according to the second DCI element. The base station 104 includes a second PUCCH resource assignment in the second DCI element for the UE 102 to transmit a HARQ ACK on a second PUCCH resource indicated in the second PUCCH resource assignment. The base station 104 also includes a second PDSCH assignment configuring the second PDSCH in the second DCI element.

If the UE 106 receives the first MAC PDU in the first HARQ transmission, the UE 106 may not receive the second PDSCH, or the UE 106 may receive the second PDSCH and may not process the second HARQ transmission. If the UE 102 receives the first HARQ transmission and the second HARQ transmission, the UE 102 may combine the first HARQ transmission and the second HARQ transmission together and decode the combination of the first HARQ transmission and the second HARQ transmission. If the UE 102 obtains the first MAC PDU from successfully decoding the combination, the UE 102 identifies the response 1 from the first MAC PDU by using the contention resolution identity of the UE 102. Then the UE 102 transmits 432 a second HARQ ACK on the second PUCCH resource indicated in the second DCI to the base station 104.

If the UE 102 does not receive the first HARQ transmission and receives the second HARQ transmission, the UE 102 decodes the second HARQ transmission. If the UE 102 successfully decodes 430 the second HARQ transmission to obtain the first MAC PDU, the UE 102 identifies the response 1 from the first MAC PDU according to the contention resolution identity of the UE 102. In response to receiving the second HARQ ACK from the UE 102, the base station 104 stops transmitting 434 the first MAC PDU.

If the UE 102 does not obtain the first MAC PDU from the second HARQ transmission or does not receive the second HARQ transmission, the UE 102 does not transmit HARQ feedback (e.g., neither a HARQ ACK nor a HARQ NACK). Since the base station 104 does not receive a HARQ ACK from the UE 102, the base station 104 in some implementations may generate a third HARQ transmission of the first MAC PDU and transmits the third HARQ transmission on a third PDSCH to the UE 102. In some implementations, the base station 104 uses the same redundant version (RV) or different RVs for the first HARQ transmission, the second HARQ transmission, and the third HARQ transmission.

Figure 5:
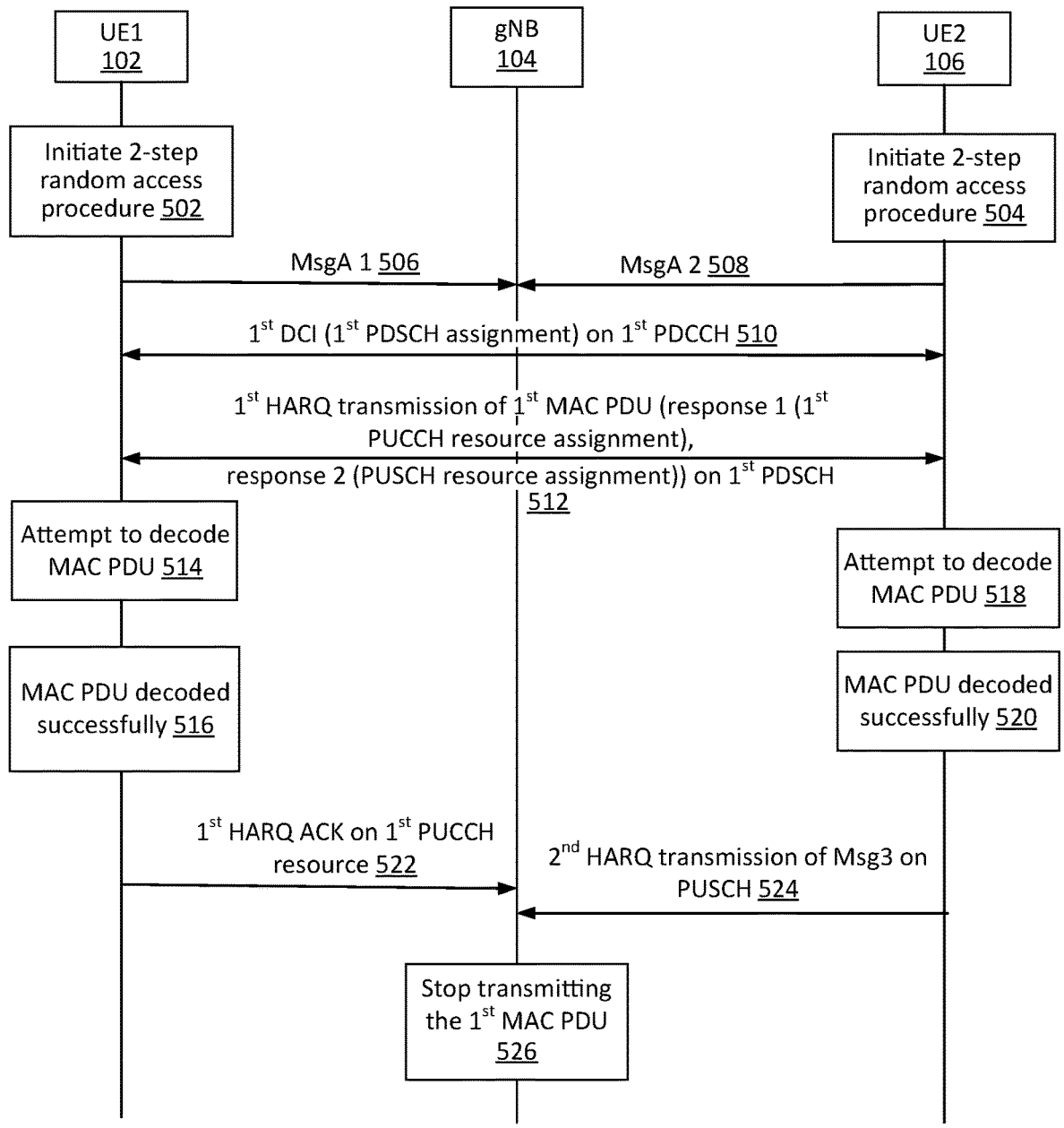
FIG. 5 is a messaging diagram of an example procedure for providing resource assignments via a MAC PDU to user devices for communicating with the base station including a control channel resource assignment for a first user device to transmit an acknowledgement of a MAC PDU from the base station and a shared channel resource assignment for a second user device to transmit a data payload.

FIG. 5 is a messaging diagram of an example procedure for providing a control channel resource assignment via a MAC PDU to UE 102 for transmitting an acknowledgement of a response message from the base station 104 without providing a control channel resource assignment to UE 106 to transmit an acknowledgement of the response message, and instead providing a shared channel resource assignment via the MAC PDU to UE 106 to transmit a data payload of the MsgA sent by UE 106 While many of the steps in the messaging diagram of FIG. 5 are similar to the steps in the messaging diagram of FIG. 3, the differences are described in more detail below. The base station 104 generates a first DCI element including the first PDSCH assignment configuring the first PDSCH. The base station 104 includes the response 1 (e.g., a MsgB) and the response 2 (e.g., a Msg2) in the first MAC PDU. Moreover, the base station 104 includes the first PUCCH resource assignment in the response 1 of the first MAC PDU instead of the first DCI element as in step 310 of the messaging diagram of FIG. 3. The base station 104 also includes the first PUSCH resource assignment in the response 2 of the first MAC PDU. The first PUCCH resource assignment and the first PUSCH resource assignment may be different. The first PUCCH resource assignment configures a first PUCCH resource and the first PUSCH resource assignment configures a first PUSCH resource. The first PUCCH resource and the first PUSCH resource may be different or may not overlap. The base station 104 transmits 510 the first DCI element on a first PDCCH and transmits 512 the first MAC PDU.

While the messaging diagram of FIG. 5 includes two UEs 102, 106, this is not intended to be limiting and the base station 104 may receive MsgAs at the same time from three UEs, four UEs, or any suitable number of UEs. The base station 104 may then include responses to each of the UEs in the MAC PDU. For the UEs having MsgAs that the base station 104 successfully decodes, the base station 104 includes control channel resource assignments, such as PUCCH resource assignments in the MAC PDU for the corresponding UEs to acknowledge the respective responses. For the UEs having MsgAs that the base station 104 fails to decode but detects a random access preamble, the base station 104 includes shared channel resource assignments, such as PUSCH resource assignments also in the MAC PDU for the corresponding UEs to transmit Msg3s.

Figure 6:
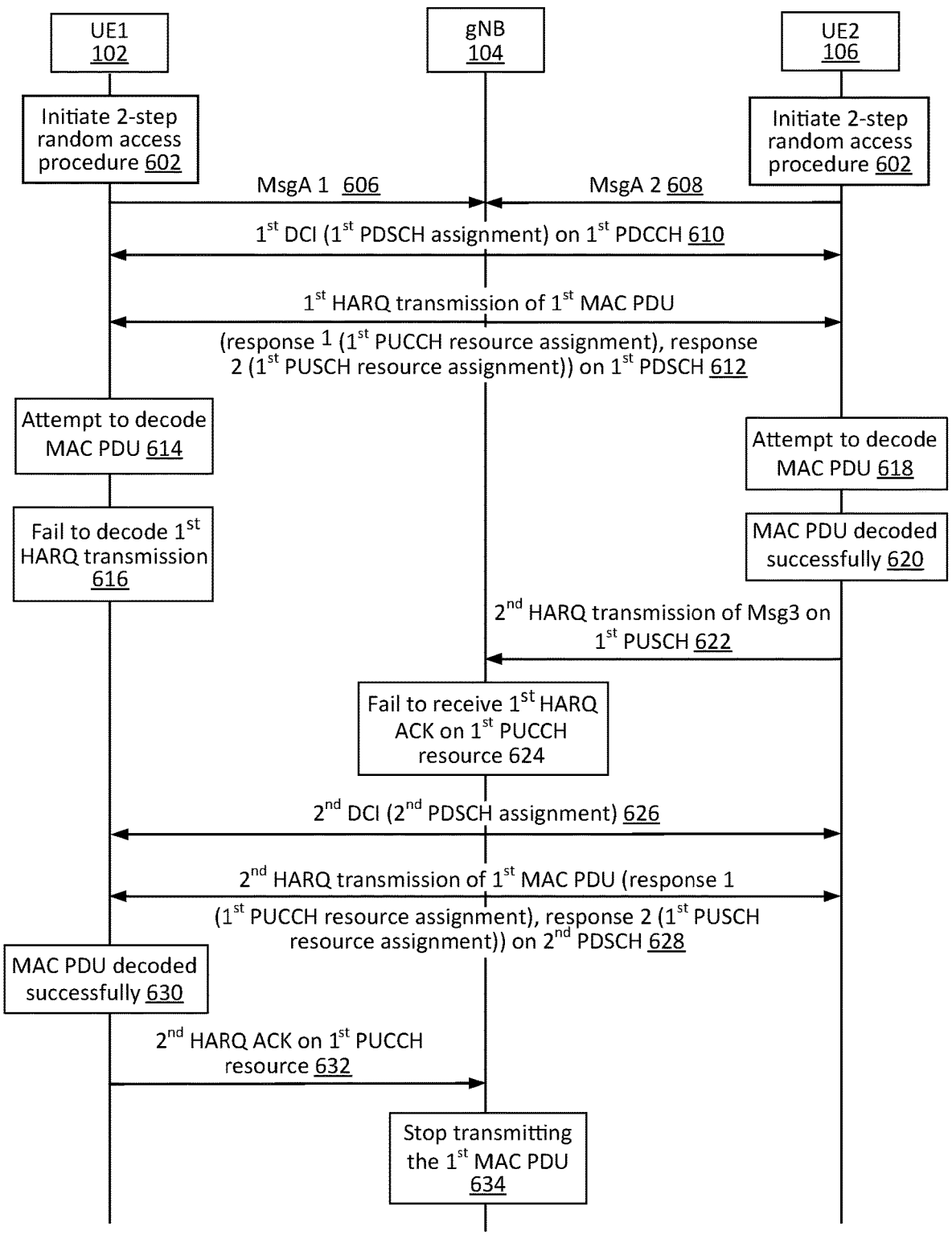
FIG. 6 is a messaging diagram of an example procedure for providing resource assignments to user devices for transmitting acknowledgements of a response message from the base station and for transmitting data payloads to the base station and retransmitting the response message when one of the user devices does not transmit an acknowledgement or data payload.

FIG. 6 illustrates an example scenario where the UE 102 does not successfully decode the MAC PDU transmitted by the base station 104. More specifically, FIG. 6 depicts a messaging diagram of an example procedure for providing a resource assignment to the UE 102 for transmitting an acknowledgement of a response message from the base station 104 and retransmitting the response message when the base station 104 does not receive an acknowledgement. While many of the steps in the messaging diagram of FIG. 6 are similar to the steps in the messaging diagrams of FIGS. 4 and 5, the differences are described in more detail below. The base station 104 generates a first DCI element including the first PDSCH assignment configuring the first PDSCH. The base station 104 includes the response 1 and the response 2 in the first MAC PDU, and includes the first PUCCH resource assignment in the first MAC PDU instead of the first DCI element as in step 410 of the messaging diagram as shown in FIG. 4. The base station 104 transmits 610 the first DCI element on a first PDCCH and transmits 612 the first MAC PDU.

The UE 102 either fails 616 to decode the first HARQ transmission or does not receive the first HARQ transmission and accordingly, does not transmit the first HARQ ACK to the base station 104. As a result, the base station 104 does not receive 624 the first HARQ ACK on the first PUCCH resource, and in some implementations may generate a second HARQ transmission of the first MAC PDU and transmit 628 the second HARQ transmission on a second PDSCH to the UE 102. The base station 104 transmits 626 a second DCI element configuring the second PDSCH on a second PDCCH. The UE 102 receives the second DCI element on the second PDCCH and receives the second HARQ transmission on the second PDSCH according to the second DCI element. The base station 104 includes the first PUCCH resource assignment in the second HARQ transmission of the MAC PDU for the UE 102 to transmit a HARQ ACK on the first PUCCH resource indicated in the first PUCCH resource assignment. The base station 104 also includes a second PDSCH assignment configuring the second PDSCH in the second DCI element.

If the UE 106 receives the first MAC PDU in the first HARQ transmission, the UE 106 may not receive the second PDSCH, or the UE 106 may receive the second PDSCH and may not process the second HARQ transmission. If the UE 102 receives the first HARQ transmission and the second HARQ transmission, the UE 102 may combine the first HARQ transmission and the second HARQ transmission together and decode the combination of the first HARQ transmission and the second HARQ transmission. If the UE 102 obtains the first MAC PDU from successfully decoding the combination, the UE 102 identifies the response 1 from the first MAC PDU by using the contention resolution identity of the UE 102. Then the UE 102 transmits 632 a second HARQ ACK on the first PUCCH resource indicated in the second HARQ transmission of the MAC PDU to the base station 104.

If the UE 102 does not receive the first HARQ transmission and receives the second HARQ transmission, the UE 102 decodes the second HARQ transmission. If the UE 102 successfully decodes 630 the second HARQ transmission to obtain the first MAC PDU, the UE 102 identifies the response 1 from the first MAC PDU according to the contention resolution identity of the UE 102. In response to receiving the second HARQ ACK from the UE 102, the base station 104 stops transmitting 634 the first MAC PDU.

In some implementations, the base station 104 may transmit PUCCH resource assignments to the UE 102, 106 via a MAC PDU and a DCI element. For example, the base station 104 may successfully decode the MsgAs from each of the UEs. The base station 104 may then generate a DCI element including a first PUCCH resource assignment configuring a first PUCCH resource for the UE 102 to transmit a HARQ ACK in response to successfully decoding the MAC PDU in the HARQ transmission. The base station 104 may also generate a MAC PDU including a second PUCCH resource assignment configuring a second PUCCH resource for the UE 106 to transmit a HARQ ACK in response to successfully decoding the MAC PDU in the HARQ transmission.

Figure 7:
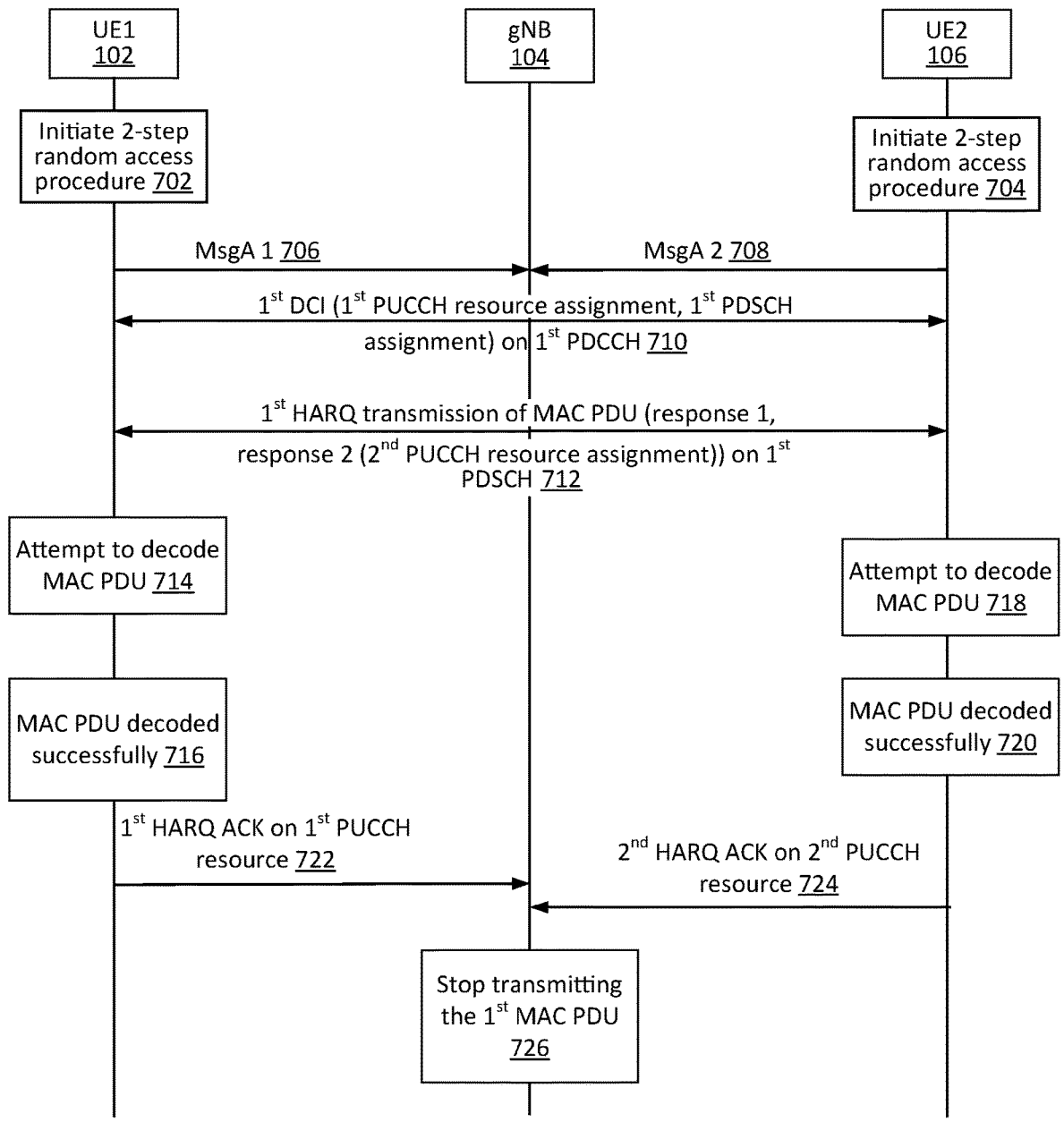
FIG. 7 is a messaging diagram of an example procedure for providing a first control channel resource assignment via a DCI element to a first user device for transmitting an acknowledgement of a MAC PDU from the base station and providing a second control channel resource assignment via the MAC PDU to a second user device for transmitting an acknowledgement of the MAC PDU from the base station.

FIG. 7 depicts a messaging diagram of an example procedure for providing a first control channel resource assignment via a DCI to UE 102 for transmitting an acknowledgement of a first response from the base station 104, and providing a second control channel resource assignment via a MAC PDU to UE 106 for transmitting an acknowledgement of a second response from the base station 104. As shown in FIG. 7, UE 102 and UE 106 both initiate 702, 704 a two-step RACH procedure. In particular, a base station (e.g., gNB) 104 receives 706, 708 a MsgA 1 from UE 102 and a MsgA 2 from UE 106. The base station 104 generates a response 1 (e.g., a MsgB 1) and a first PUCCH resource assignment to respond to the MsgA 1 or a random access preamble in the MsgA 1, and generates a response 2 (e.g., a MsgB 2) and a second PUCCH resource assignment to respond to the MsgA 2 or a random access preamble in the MsgA 2. The first PUCCH resource assignment configures a first PUCCH resource for the UE 102 to transmit a first HARQ ACK. The second PUCCH resource assignment configures a second PUCCH resource for the UE 106 to transmit a second HARQ ACK. The first PUCCH resource and the second PUCCH resource may be different or may not overlap. In one example, the first and second PUCCH resources can be on different OFDM symbols, different slots, different subcarriers or different physical resource blocks. The OFDM can be a Discrete Fourier Transform-Spread (DFT-S-OFDM) or a cyclic-prefix (CP) OFDM.

The base station 104 includes the response 1, the response 2 and the second PUCCH resource assignment in a first MAC PDU and generates a first HARQ transmission of the first MAC PDU. The base station includes the first PUCCH resource assignment in a first DCI element according to a format of the first DCI element. The first DCI element configures a first PDSCH which includes the first HARQ transmission. The base station 104 transmits 710 the first DCI element on a first PDCCH and the first DCI element configures (i.e., assigns) a first PDSCH to the UEs. The base station 104 transmits 712 a first HARQ transmission of the first MAC PDU on the first PDSCH.

The UEs 102 and 106 perform PDCCH monitoring to receive the first PDSCH. If the UE 102 receives the first MAC PDU on the first PDSCH, the UE 102 transmits 722 a first HARQ ACK according to the first PUCCH resource assignment. If the base station 104 receives the first HARQ ACK on the first PUCCH resource, the base station 104 determines the UE 102 received the response 1 or the first MAC PDU. If the UE 102 fails to receive the first MAC PDU on the first PDSCH, the UE 102 does not transmit a HARQ ACK on the first PUCCH resource. In this case, the UE 102 may or may not transmit a HARQ NACK on the first PUCCH resource. Consequently, the base station 104 does not receive the first HARQ ACK. The base station 104 determines the UE 102 does not receive the response 1 or the first MAC PDU due to not receiving a HARQ ACK on the first PUCCH resource.

Likewise, if the UE 106 receives the first MAC PDU on the first PDSCH, the UE 106 identifies the second PUCCH resource assignment from the response 2 in the first MAC PDU. The UE 106 transmits 724 a second HARQ ACK according to the second PUCCH resource assignment. If the base station 104 receives the second HARQ ACK on the second PUCCH resource, the base station 104 determines the UE 106 received the response 2. If the UE 106 does not receive the first MAC PDU on the first PDSCH, the UE 106 does not transmit the second HARQ ACK on the second PUCCH resource. In this case, the base station 104 does not receive the second HARQ ACK. The base station 104 determines the UE 106 does not receive the response 2 due to not receiving a HARQ ACK on the second PUCCH resource.

The base station 104 can determine whether the UE 102 received the response 1 according to whether a HARQ ACK is received from the UE 102 on the first PUCCH resource. The base station 104 can determine whether the UE 106 received the response 2 according to whether a HARQ ACK is received from the UE 106 on the second PUCCH resource.

In some implementations, the base station 104 transmits the first MAC PDU using a HARQ transmission scheme. For example, the base station 104 generates a first HARQ transmission of the first MAC PDU and transmits the first HARQ transmission on the first PDSCH to the UE 102 and UE 106. The UE 102 receives the first HARQ transmission and attempts to decode 714 the first HARQ transmission to obtain the first MAC PDU. If the UE 102 successfully decodes 716 the first HARQ transmission to obtain the first MAC PDU and identifies the response 1, the UE 102 transmits the first HARQ ACK 722 on the first PUCCH resource included in the response 1 to the base station 104 to acknowledge reception of the first MAC PDU or the response 1. In some implementations, the UE 102 may identify the response 1 according to a contention resolution identity in the response 1. The contention resolution identity may be associated with/generated from content in a payload of the MsgA 1. For example, if the UE 102 identifies the contention resolution identity in the response 1 is generated from the content in the payload of the MsgA 1, the UE 102 identifies the response 1 as a response intended for the UE 102.

Likewise, the UE 106 receives the first HARQ transmission and attempts to decode 718 the first HARQ transmission to obtain the first MAC PDU. If the UE 106 successfully decodes 720 the first HARQ transmission to obtain the first MAC PDU and identifies the response 2, the UE 106 transmits 724 the second HARQ ACK on the second PUCCH resource included in the response 2 to the base station 104 to acknowledge reception of the first MAC PDU or the response 2. In some implementations, the UE 106 may identify the response 2 according to a contention resolution identity in the response 2. The contention resolution identity may be associated with/generated from content in a payload of the MsgA 2. For example, if the UE 106 identifies the contention resolution identity in the response 2 is generated from the content in the payload of the MsgA 2, the UE 106 identifies the response 2 as a response intended for the UE 106.

In response to receiving a HARQ ACK from each of the UEs 102, 106, the base station 104 then stops transmitting 726 the first MAC PDU. In some implementations, the UE 102 and the UE 106 may transmit HARQ ACKs at the same time (e.g., with different spatial assignments). In other implementations, the UE 102 and the UE 106 may transmit the HARQ ACKs at different time slots or different OFDM symbols.

While the messaging diagram of FIG. 7 includes two UEs 102, 106, this is not intended to be limiting and the base station 104 may receive MsgAs at the same time from three UEs, four UEs, or any suitable number of UEs. The base station 104 may then include responses to each of the UEs in the MAC PDU. For a first UE, the base station 104 includes a first control channel resource assignment, such as a first PUCCH resource assignments in the DCI element for the first UE to acknowledge a first response from the base station 104. For additional UEs, the base station 104 includes additional control channel resource assignments, such as additional PUCCH resource assignments in the MAC PDU for the additional UEs to acknowledge respective responses from the base station 104.

Figure 8:
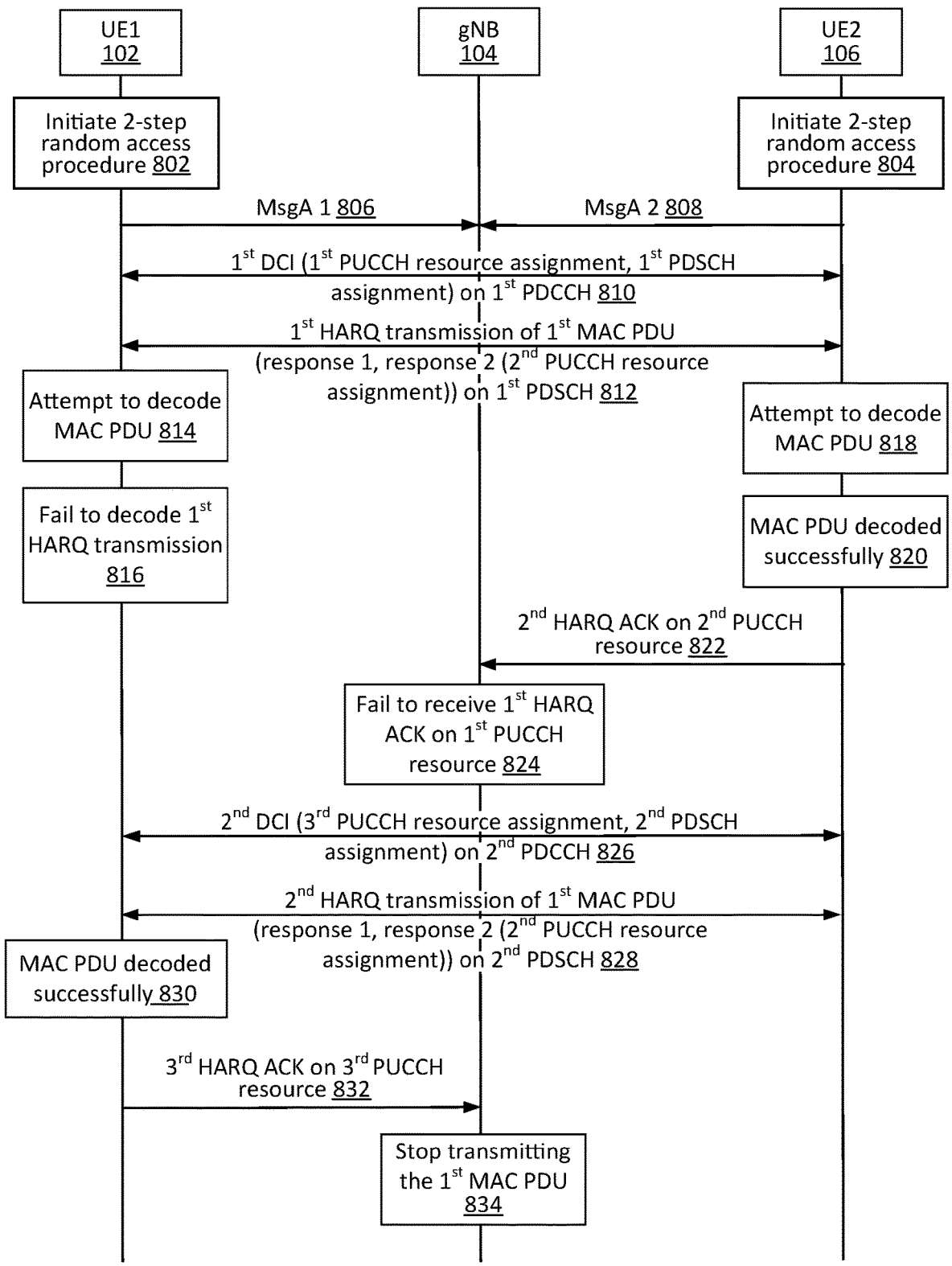
FIG. 8 is a messaging diagram of an example procedure for providing resource assignments to user devices for transmitting acknowledgements of a response message from the base station and retransmitting the response message when a first user device does not transmit an acknowledgement.

In the example scenario shown in the messaging diagram of FIG. 7, both the UE 102 and the UE 106 successfully decode the MAC PDU and transmit a HARQ ACK in response to the first HARQ transmission from the base station. FIGS. 8-11 illustrate example scenarios where one or both of the UEs 102, 106 do not successfully decode the MAC PDU. More specifically, FIG. 8 depicts a messaging diagram of an example procedure for providing control channel resource assignments to UEs 102, 106 for transmitting acknowledgements of a response message from the base station 104 and retransmitting the response message when the base station 104 does not receive an acknowledgement from the UE 102. While many of the steps in the messaging diagram of FIG. 8 are similar to the steps in the messaging diagram of FIG. 7, the differences are described in more detail below.

In the messaging diagram in FIG. 8, the base station 104 fails 824 to receive the first HARQ ACK on the first PUCCH resource from the UE 102. In response to failing to receive the first HARQ ACK, the base station 104 transmits 826 a second DCI element on a second PDCCH and the second DCI element configures (i.e., assigns) a third PUCCH resource assignment and a second PDSCH to the UE 102. The base station 104 transmits 828 a second HARQ transmission of the first MAC PDU on the second PDSCH. If the UE 106 receives the first MAC PDU in the first HARQ transmission, the UE 106 may not receive the second PDSCH, or the UE 106 may receive the second PDSCH and may not process the second HARQ transmission. If the UE 102 receives the first HARQ transmission and the second HARQ transmission, the UE 102 may combine the first HARQ transmission and the second HARQ transmission together and decode the combination of the first HARQ transmission and the second HARQ transmission. If the UE 102 obtains the first MAC PDU from successfully decoding the combination, the UE 102 identifies the response 1 from the first MAC PDU based on an identifier included in the response 1 that corresponds to the UE 102. That is, if the UE 102 finds an identifier corresponding to the UE 102 in a response, the UE 102 determines the response is intended for the UE 102. In response to finding the identifier in the response 1, the UE 102 transmits 832 a third HARQ ACK on the third PUCCH resource indicated in the second DCI to the base station 104. In response to receiving the third HARQ ACK from the UE 102, the base station 104 stops transmitting 834 the first MAC PDU. The identifier of the UE 102 can be a contention resolution identity of the UE 102 or a random access preamble identity associated with a random access preamble in the MsgA 1. In some implementations, if the identity of the UE 102 is the contention resolution identity, the UE 102 may transmit 832 the third HARQ ACK on the third PUCCH resource indicated in the second DCI to the base station 104. Alternatively, if the identity of the UE 102 is the random access preamble identity, the UE 102 may not transmit the third HARQ ACK on the third PUCCH resource indicated in the second DCI to the base station 104.

If the UE 102 does not receive the first HARQ transmission and receives the second HARQ transmission, the UE 102 decodes the second HARQ transmission. If the UE 102 successfully decodes 830 the second HARQ transmission to obtain the first MAC PDU, the UE 102 identifies the response 1 from the first MAC PDU by using the contention resolution identity of the UE 102.

If the UE 102 does not obtain the first MAC PDU from the second HARQ transmission or does not receive the second HARQ transmission, the UE 102 does not transmit a HARQ ACK. In this case, the UE 102 in one implementation does not transmit a HARQ NACK. In another implementation, the UE 102 transmits a HARQ NACK on a third PUCCH resource indicated in the third PUCCH resource assignment. Since the base station 104 does not receive a HARQ ACK on the third PUCCH resource indicated in the third PUCCH resource assignment from the UE 102, the base station 104 in some implementations may generate a third HARQ transmission of the first MAC PDU. The base station 104 transmits a third DCI element including a fourth PUCCH resource assignment configuring a fourth PUCCH resource and including a third PDSCH assignment configuring a third PDSCH, and transmits the third HARQ transmission on the third PDSCH to the UE 102. The fourth PUCCH resource and the third PUCCH resource may be the same or different. The fourth PUCCH resource and the third PUCCH resource may or may not overlap. In one example, the fourth and third PUCCH resources can be on the same or different OFDM symbols, same or different slots, same or different subcarriers or same or different physical resource blocks. The OFDM can be a Discrete Fourier Transform-Spread (DFT-S-OFDM) or a cyclic-prefix (CP) OFDM.

In some implementations, the base station 104 uses the same redundant version (RV) or different RVs for the first HARQ transmission, the second HARQ transmission, and the third HARQ transmission. In some implementations, two or three of the first, third, and fourth PUCCH resource assignments are the same. In other implementations, the first, third, and fourth PUCCH resource assignments are different. In some implementations, the second PDSCH assignment may be the same as the first PDSCH assignment. The third PDSCH assignment may be the same as the first or second PDSCH assignment. In other implementations, the third PDSCH assignment may be different from the first or second PDSCH assignment.

Figure 9:
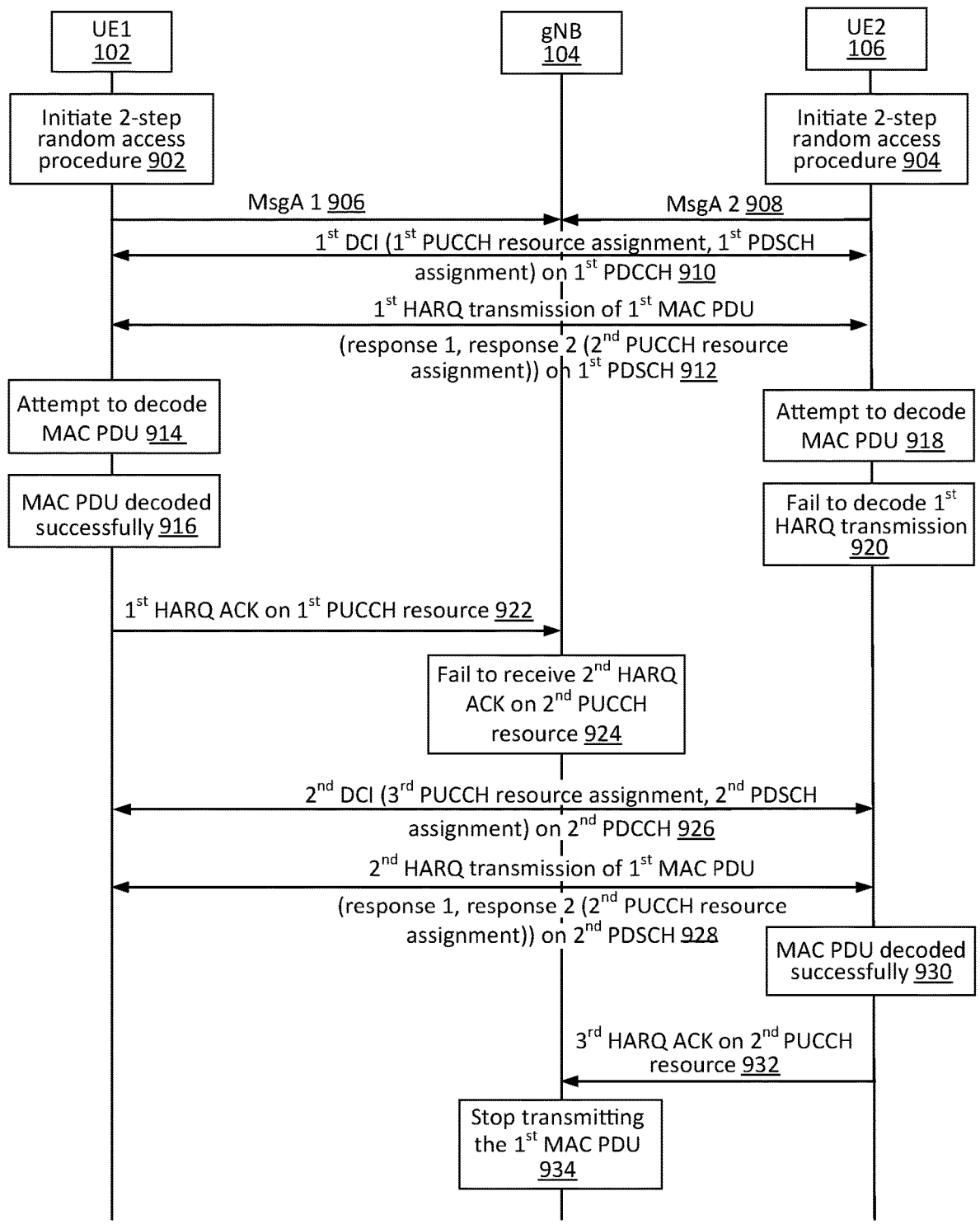
FIG. 9 is a messaging diagram of an example procedure for providing resource assignments to user devices for transmitting acknowledgements of a response message from the base station and retransmitting the response message when a second user device does not transmit an acknowledgement.

FIG. 9 depicts a messaging diagram of an example procedure for providing control channel resource assignments to UEs 102, 106 for transmitting acknowledgements of a response message from the base station 104 and retransmitting the response message when the base station 104 does not receive an acknowledgement from the UE 106. While many of the steps in the messaging diagram of FIG. 9 are similar to the steps in the messaging diagram of FIG. 7, the differences are described in more detail below.

In FIG. 9, the base station 104 fails 924 to receive the second HARQ ACK on the second PUCCH resource from the UE 106. In response to failing to receive the second HARQ ACK, the base station 104 transmits 926 a second DCI element on a second PDCCH and the second DCI element configures (i.e., assigns) a third PUCCH resource assignment and a second PDSCH to the UE 106. The base station 104 transmits 928 a second HARQ transmission of the first MAC PDU on the second PDSCH. The first MAC PDU includes a response 1, and a response 2 including the second PUCCH resource assignment configuring the second PUCCH resource for the UE 106 to transmit an acknowledgement of the response message. If the UE 102 receives the first MAC PDU in the first HARQ transmission, the UE 102 may not receive the second PDSCH, or the UE 102 may receive the second PDSCH and may not process the second HARQ transmission. If the UE 106 receives the first HARQ transmission and the second HARQ transmission, the UE 106 may combine the first HARQ transmission and the second HARQ transmission together and decode the combination of the first HARQ transmission and the second HARQ transmission. If the UE 106 obtains the first MAC PDU from successfully decoding the combination, the UE 106 identifies the response 2 from the first MAC PDU based on an identifier included in the response 2 which corresponds to the UE 106. If the UE 106 finds the identifier corresponding to the UE 106 in a response, the UE 106 determines the response is for the UE 106. In response to finding the identifier corresponding to the UE 106 in the response 2, the UE 106 transmits 932 a third HARQ ACK on the second PUCCH resource indicated in the MAC PDU to the base station 104. In response to receiving the third HARQ ACK from the UE 106, the base station 104 stops transmitting 934 the first MAC PDU. The identifier can be a contention resolution identity of the UE 106 or a random access preamble identity associated with a random access preamble in the MsgA 2. In some implementations, if the identifier corresponding to the UE 106 is the contention resolution identity, the UE 106 transmits 932 the third HARQ ACK on the second PUCCH resource indicated in the response 2 to the base station 104. Alternatively, if the identifier corresponding to the UE 106 is the random access preamble identity, the UE 106 may not transmit the third HARQ ACK on the second PUCCH resource indicated in the response 2 to the base station 104.

If the UE 106 does not receive the first HARQ transmission and receives the second HARQ transmission, the UE 106 decodes the second HARQ transmission. If the UE 106 successfully decodes 930 the second HARQ transmission to obtain the first MAC PDU, the UE 106 identifies the response 2 from the first MAC PDU by using the contention resolution identity of the UE 106.

If the UE 106 does not obtain the first MAC PDU from the second HARQ transmission or does not receive the second HARQ transmission, the UE 106 may not transmit a HARQ ACK or a HARQ NACK. Since the base station 104 does not receive a HARQ ACK from the UE 106, the base station 104 in some implementations may generate a third HARQ transmission of the first MAC PDU. The base station 104 transmits a third DCI element including a fourth PUCCH resource assignment configuring a fourth PUCCH resource and including a third PDSCH assignment configuring a third PDSCH, and transmits the third HARQ transmission having the response 2 which includes the second PUCCH resource assignment configuring the second PUCCH resource for the UE 106 to transmit an acknowledgement of the response message on the third PDSCH to the UE 102.

In some implementations, the base station 104 uses the same redundant version (RV) or different RVs for the first HARQ transmission, the second HARQ transmission, and the third HARQ transmission. In some implementations, the fourth PUCCH resource assignment may be the same as the second PUCCH resource assignment. In other implementations, the fourth PUCCH resource assignment may be different from the second PUCCH resource assignment. In some implementations, the second PDSCH assignment may be the same as the first PDSCH assignment. The third PDSCH assignment may be the same as the first or second PDSCH assignments. In other implementations, the third PDSCH assignment may be different from the first or second PDSCH assignments.

Figure 10:
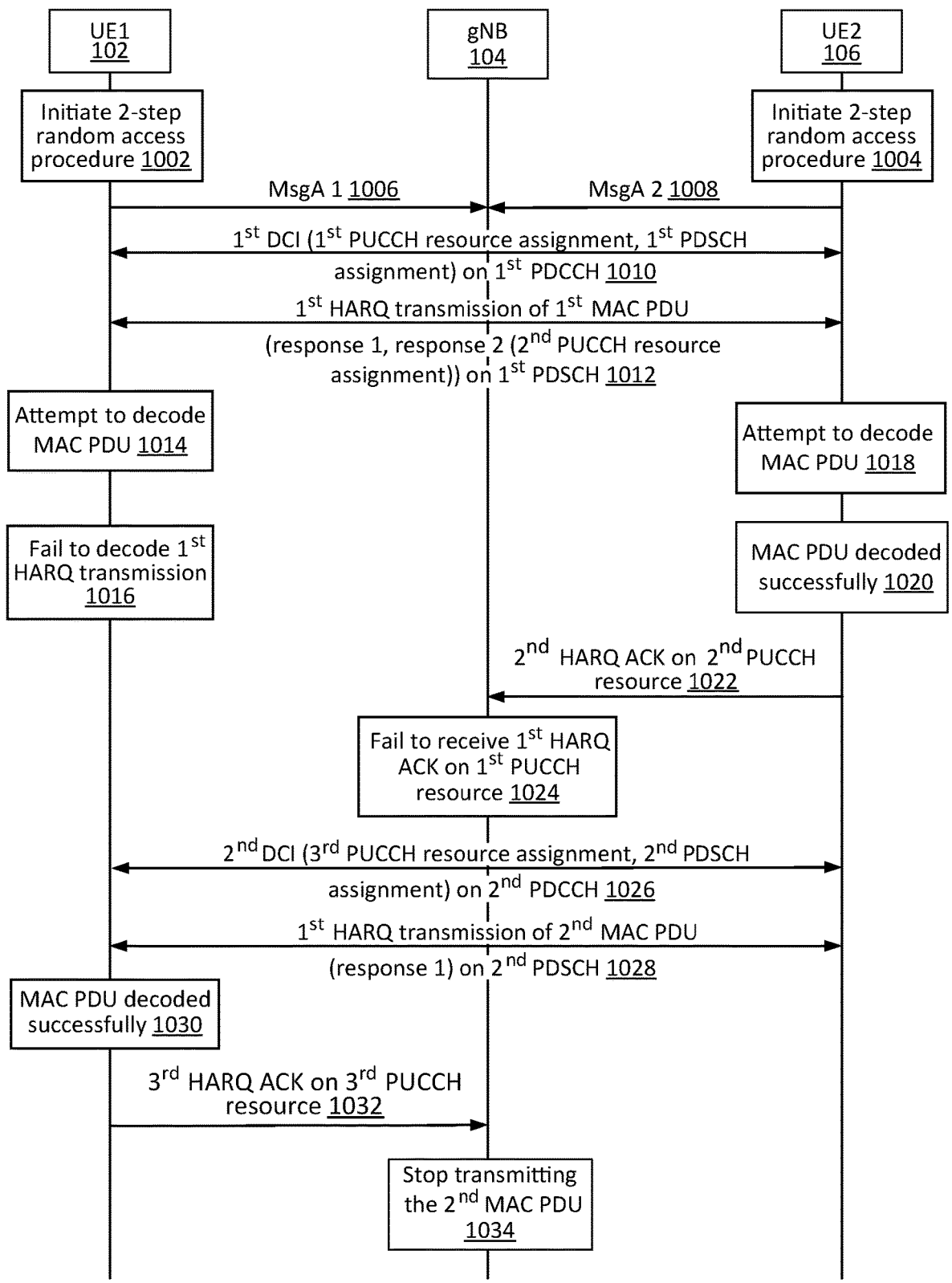
FIG. 10 is a messaging diagram of an example procedure for providing resource assignments to user devices for transmitting acknowledgements of a response message from the base station and transmitting a second response message when a first user device does not transmit an acknowledgement.

FIG. 10 depicts a messaging diagram of an example procedure for providing control channel resource assignments to UEs 102, 106 for transmitting acknowledgements of a response message from the base station 104 and transmitting a second response message when the base station 104 does not receive an acknowledgement from the UE 102. While many of the steps in the messaging diagram of FIG. 10 are similar to the steps in the messaging diagram of FIG. 8, the differences are described in more detail below.

In response to failing to receive 1024 the first HARQ ACK on the first PUCCH resource from the UE 102, the base station 104 transmits 1026 a second DCI element on a second PDCCH and the second DCI element configures (i.e., assigns) a third PUCCH resource assignment configuring a third PUCCH resource for the UE 102 to transmit an acknowledgement of the response message and the DCI element configures a second PDSCH. The base station 104 also generates a second MAC PDU including the response 1 without including the response 2. The base station 104 transmits 1028 a second HARQ transmission of the second MAC PDU on the second PDSCH. If the UE 106 receives the first MAC PDU in the first HARQ transmission, the UE 106 may not receive the second PDSCH, or the UE 106 may receive the second PDSCH and may not process the second HARQ transmission.

If the UE 102 receives the first HARQ transmission and the second HARQ transmission, the UE 102 does not combine the first HARQ transmission and the second HARQ transmission together to decode the combination of the first HARQ transmission and the second HARQ transmission. Instead, the UE 102 discards the first HARQ transmission and decodes the second HARQ transmission. If the UE 102 obtains the second MAC PDU from the second HARQ transmission, the UE 102 identifies the response 1 from the first MAC PDU based on an identifier in the response 1 corresponding to the UE 102. If the UE 102 finds the identifier corresponding to the UE 102 in a response, the UE 102 determines the response is intended for the UE 102. In response to finding the identifier corresponding to the UE 102 in the response 1, the UE 102 transmits 1032 a third HARQ ACK on a third PUCCH resource indicated in the second DCI to the base station 104. In response to receiving the third HARQ ACK from the UE 102, the base station 104 stops transmitting 1034 the second MAC PDU. The identifier corresponding to the UE 102 can be a contention resolution identity of the UE 102 or a random access preamble identity associated with a random access preamble in the MsgA 1. In some implementations, if the identifier corresponding to the UE 102 is the contention resolution identity, the UE 102 may transmit 1032 the third HARQ ACK on the third PUCCH resource indicated in the second DCI to the base station 104. Alternatively, if the identifier corresponding to the UE 102 is the random access preamble identity, the UE 102 may not transmit the third HARQ ACK on the third PUCCH resource indicated in the second DCI to the base station 104.

If the UE 102 does not receive the first HARQ transmission and receives the second HARQ transmission, the UE 102 decodes the second HARQ transmission. If the UE 102 successfully decodes 1030 the second HARQ transmission to obtain the second MAC PDU, the UE 102 identifies the response 1 from the second MAC PDU by using the contention resolution identity of the UE 102.

If the UE 102 does not obtain the second MAC PDU from the second HARQ transmission or does not receive the second HARQ transmission, the UE 102 does not transmit a HARQ ACK. In this case, the UE 102 in one implementation does not transmit a HARQ NACK either. In another implementation, the UE 102 transmits a HARQ NACK on a third PUCCH resource indicated in the third PUCCH resource assignment. Since the base station 104 does not receive a HARQ ACK on the third PUCCH resource indicated in the third PUCCH resource assignment from the UE 102, the base station 104 in some implementations may generate a third HARQ transmission of the second MAC PDU. The base station 104 transmits a third DCI element including a fourth PUCCH resource assignment configuring a fourth PUCCH resource and including a third PDSCH assignment configuring a third PDSCH, and transmits the third HARQ transmission on the third PDSCH to the UE 102. The third PUCCH resource and the first PUCCH resource may be the same or different. The third PUCCH resource and the first PUCCH resource may or may not overlap. In one example, the third and first PUCCH resources can be on the same or different OFDM symbols, same or different slots, same or different subcarriers or same or different physical resource blocks. The OFDM can be a Discrete Fourier Transform-Spread (DFT-S-OFDM) or a cyclic-prefix (CP) OFDM.

In some implementations, the base station 104 uses the same redundant version (RV) or different RVs for the first HARQ transmission, the second HARQ transmission, and the third HARQ transmission. In some implementations, two or three of the first, third, and fourth PUCCH resource assignments are the same. In other implementations, the first, third, and fourth PUCCH resource assignments are different. In some implementations, the second PDSCH assignment may be same as the first PDSCH assignment. The third PDSCH assignment may be the same as the first or second PDSCH assignment. In other implementations, the third PDSCH assignment may be different from the first or second PDSCH assignment.

Figure 11:
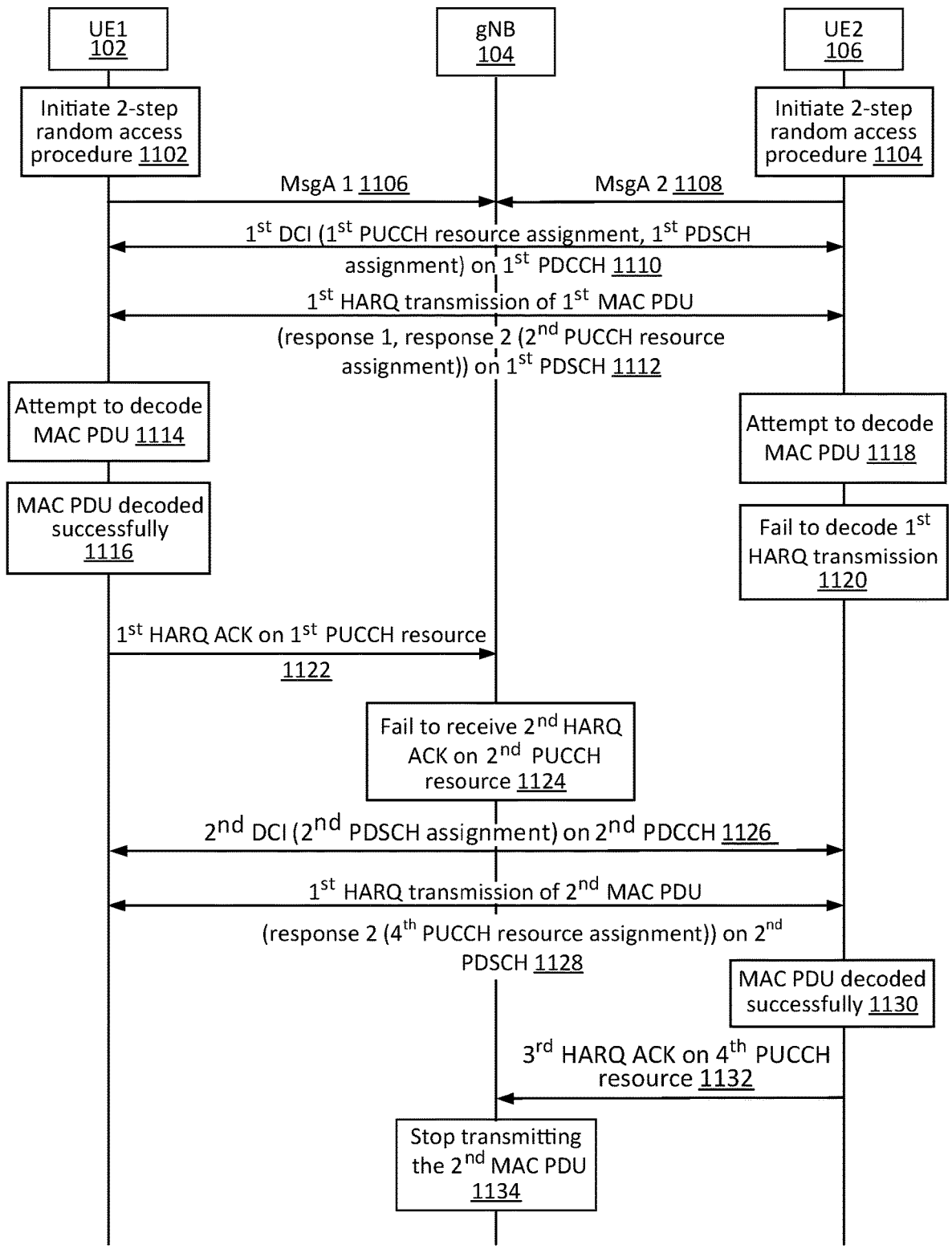
FIG. 11 is a messaging diagram of an example procedure for providing resource assignments to user devices for transmitting acknowledgements of a response message from the base station and transmitting a second response message when a second user device does not transmit an acknowledgement.

FIG. 11 depicts a messaging diagram of an example procedure for providing resource assignments to UEs 102, 106 for transmitting acknowledgements of a response message from the base station 104 and transmitting a second response message when the base station 104 does not receive an acknowledgement from the UE 106. While many of the steps in the messaging diagram of FIG. 11 are similar to the steps in the messaging diagram of FIG. 9, the differences are described in more detail below.

In response to failing to receive 1124 the second HARQ ACK on the second PUCCH resource from the UE 106, the base station 104 transmits 1126 a second DCI element on a second PDCCH and the second DCI element configures (i.e., assigns) a second PDSCH. The base station 104 also generates a second MAC PDU including the response 2 without including the response 1. The base station 104 may include in the second MAC PDU a fourth PUCCH resource assignment configuring a fourth PUCCH resource for the UE 106 to transmit a third HARQ ACK. The base station 104 transmits 1128 a second HARQ transmission of the second MAC PDU on the second PDSCH. If the UE 102 receives the first MAC PDU in the first HARQ transmission, the UE 102 may not receive the second PDSCH, or the UE 102 may receive the second PDSCH and may not process the second HARQ transmission.

If the UE 106 receives the first HARQ transmission and the second HARQ transmission, the UE 106 does not combine the first HARQ transmission and the second HARQ transmission together and decode the combination of the first HARQ transmission and the second HARQ transmission. Instead, the UE 106 discards the first HARQ transmission and decodes the second HARQ transmission. If the UE 106 obtains the second MAC PDU from successfully decoding 1130 the second HARQ transmission, the UE 106 may identify the response 2 from the second MAC PDU based on an identifier included in response 2 which corresponds to the UE 106. If the UE 106 finds the identifier corresponding to the UE 106 in a response, the UE 106 determines the response is intended for the UE 106. In response to finding the identifier in the response 2, the UE 106 transmits 1132 a third HARQ ACK on the fourth PUCCH resource indicated in the response 2 to the base station 104. In response to receiving the third HARQ ACK from the UE 106, the base station 104 stops transmitting 1134 the second MAC PDU. The identifier can be a contention resolution identity of the UE 106 or a random access preamble identity associated with a random access preamble in the MsgA 2. In some implementations, if the identifier corresponding to the UE 106 is the contention resolution identity, the UE 106 transmits 1132 the third HARQ ACK on the fourth PUCCH resource indicated in the response 2 to the base station 104. Alternatively, if the identifier corresponding to the UE 106 is the random access preamble identity, the UE 106 may not transmit the third HARQ ACK on the fourth PUCCH resource indicated in the response 2 to the base station 104.

If the UE 106 does not receive the first HARQ transmission and receives the second HARQ transmission, the UE 106 decodes the second HARQ transmission. If the UE 106 successfully decodes 1130 the second HARQ transmission to obtain the second MAC PDU, the UE 106 identifies the response 2 from the second MAC PDU by using the contention resolution identity corresponding to the UE 106.

If the UE 106 does not obtain the second MAC PDU from the second HARQ transmission or does not receive the second HARQ transmission, the UE 106 does not transmit a HARQ ACK. In this case, the UE 106 in one implementation does not transmit a HARQ NACK either. Since the base station 104 does not receive a HARQ ACK on the PUCCH resource indicated in the fourth PUCCH resource assignment from the UE 106, the base station 104 in some implementations may generate a third HARQ transmission of the second MAC PDU including a sixth PUCCH resource assignment configuring a sixth PUCCH resource for the UE 106 to transmit an acknowledgement of the response message. The base station 104 transmits a third DCI element including a third PDSCH assignment configuring a third PDSCH, and then transmits the third HARQ transmission on the third PDSCH to the UE 106. The sixth PUCCH resource and the fourth PUCCH resource may be the same or different. The sixth PUCCH resource and the fourth PUCCH resource may or may not overlap. In one example, the sixth and fourth PUCCH resources can be on the same or different OFDM symbols, same or different slots, same or different subcarriers or same or different physical resource blocks. The OFDM can be a Discrete Fourier Transform-Spread (DFT-S-OFDM) or a cyclic-prefix (CP) OFDM.

In some implementations, the base station 104 uses the same redundant version (RV) or different RVs for the first HARQ transmission, the second HARQ transmission, and the third HARQ transmission. In some implementations, two or three of the second, fourth, and sixth PUCCH resource assignments are the same. In other implementations, the second, fourth, and sixth PUCCH resource assignments are different. In some implementations, the second PDSCH assignment may be same as the first PDSCH assignment. The third PDSCH assignment may be same as the first or second PDSCH assignment. In other implementations, the third PDSCH assignment may be different from the first or second PDSCH assignment.

In some implementations, the base station 104 may transmit the first DCI element and a first scrambled cyclic redundancy check (CRC) on the first PDCCH for the first PDSCH. The first scrambled CRC is a first CRC scrambled by a radio network temporary identifier (RNTI). The UE 102 and UE 106 monitor the first PDCCH to receive the first DCI and the scrambled CRC. If the UE 102 and/or the UE 106 receive the first DCI element and the first scrambled CRC, the UE 102 and/or the UE 106 verify the scrambled CRC with the RNTI. If the UE 102 and/or the UE 106, in one implementation, correctly verify the first scrambled CRC, the UE 102 and/or the UE 106 receive and process the first PDSCH based on the information in the first DCI element. In another implementation, the UE 102 and/or the UE 106 receive the first PDSCH irrespective of a correct or incorrect verification of the first scrambled CRC. If the UE 102 and/or the UE 106 incorrectly verify the first scrambled CRC, the UE 102 and/or the UE 106 may not process the first PDSCH or may not receive the first PDSCH.

The base station 104 may transmit the second DCI element with a second scrambled CRC on a second PDCCH for the second PDSCH. The second scrambled CRC may be a second CRC scrambled by the RNTI. The base station 104 may transmit the third DCI element with a third scrambled CRC on a third PDCCH for the third PDSCH. The third scrambled CRC may be a third CRC scrambled by the RNTI.

If the base station 104 in some implementations fails to receive the Msg3 from the UE 106, the base station 104 may transmit the UE 106 a second DCI element configuring a second PUSCH resource for the UE 106 to transmit the Msg3. The UE 106 may then transmit the base station 104 a third HARQ transmission of the Msg3 on the second PUSCH resource configured in the second DCI element. The base station 104 may transmit the second DCI element with a second scrambled CRC on a PDCCH. The second scrambled CRC may be a second CRC scrambled by the temporary C-RNTI. If the base station 104 successfully decodes the HARQ transmission(s) to obtain the Msg3, the base station 104 transmits a Msg4 to the UE 106 in response to the Msg3. In some implementations, the Msg4 is a MAC PDU including a contention resolution identity associated with/generated from content in the Msg3. The base station 104 may transmit a HARQ transmission of the MAC PDU to the UE 106. The content can be a MAC service data unit (SDU) or a Common Control Channel (CCCH) message. In other implementations, the Msg4 is a third DCI element with a third scrambled CRC on a PDCCH. The third scrambled CRC may be a CRC scrambled with a cell-radio network temporary identifier (C-RNTI) which is assigned to the UE 106 before the UE 106 initiates the two-step random access procedure.

The base station 104 may transmit the UE 106 the third DCI element with a third scrambled CRC for the third PDSCH. In some implementations, the third scrambled CRC may be a CRC scrambled by the temporary C-RNTI included in the response message including the second PUSCH resource assignment. In other implementations, the third scrambled CRC may be a CRC scrambled by the RNTI.

In some implementations, the base station 104 configures the UE 102 and the UE 106 to share the same Control resource set (CORSET) and search space which the UE 102 and the UE 106 monitor to receive the DCI elements on the PDCCHs. The UE 102 and the UE 106 may have the same or different RNTIs. In other implementations, the base station 104 configures the UE 102 and the UE 106 to have different CORSETs, and the UE 102 and the UE 106 may share the same RNTI.

In some scenarios, the UE 102 and the UE 106 transmit the MsgA 1 and the MsgA 2 on the same OFDM symbols, slots, subcarriers or physical resource blocks. In other scenarios, the UE 102 and the UE 106 transmit the MsgA 1 and the MsgA 2 on different OFDM symbols, slots, subcarriers or physical resource blocks.

The UE 102, 106 transmitting a MsgA may then calculate the RNTI according to Equation 1, and may descramble the CRC included within a DCI element using the calculated RNTI.

In some implementations, the RNTI associated with a PRACH occasion in which a MsgA is transmitted may be computed as:

$$\text{RNTI}=1+s\_id+14\times t\_id+14\times 80\times f\_id+14\times 80\times 8\times ul\_carrier\_id+14\times 80\times 8\times 2\times \text{preamble ID of a Msg}A \quad \text{(Eq. 1)}$$

In other implementations, the RNTI associated with a PRACH occasion in which a MsgA is transmitted may be computed as:

$$\text{RNTI}=1+s\_id+14\times t\_id+14\times 80\times f\_id+14\times 80\times 8\times ul\_carrier\_id \quad \text{(Eq. 2)}$$

In further implementations, the RNTI associated with a PRACH occasion in which a MsgA is transmitted may be computed as:

$$\text{RNTI}=1+s\_id+14\times t\_id+14\times 80\times f\_id+14\times 80\times 8\times ul\_carrier\_id+14\times 80\times 8\times 2\times ra\_id, \quad \text{(Eq. 3)}$$

where:
- $s\_id$ is the index of the first OFDM symbol of the PRACH occasion ($0 \leq s\_id < 14$),
- $t\_id$ is the index of the first slot of the PRACH occasion in a system frame ($0 \leq t\_id < 80$), where the subcarrier spacing to determine $t\_id$ is based on the value of $\mu$ specified in clause 5.3.2 in TS 38.211 [8],
- $f\_id$ is the index of the PRACH occasion in the frequency domain ($0 \leq f\_id < 8$),
- $ul\_carrier\_id$ is the UL carrier used for transmission of a random access preamble included in a MsgA or is the UL carrier used for transmission of MsgA (e.g., 0 for NUL carrier, and 1 for SUL carrier),
- preamble ID is an identity or identifier of a random access preamble included in the MsgA (e.g, $0 \leq$ preamble ID $< 64$), and
- $ra\_id$ is an indication of the RACH type indicating either a two-step or four-step RACH (e.g., 0 for four-step RACH, and 1 for two-step RACH).

In some implementations, the base station 104 may include a first new data indicator (NDI) in a first DCI scheduling a first HARQ transmission, and includes a second NDI in a second DCI scheduling a second HARQ transmission. In one example, if a UE (e.g., UE 102 or UE 106) receives the first and second NDI and the first and second NDI are identical, the UE determines the MAC PDU in the first and the second HARQ transmissions are identical. Thus, the UE may combine the first and the second HARQ transmissions. In another example, if a UE (e.g., UE 102 or UE 106) receives the first and second NDI and the first and second NDI are different, the UE determines the MAC PDU in the first and the second HARQ transmissions are different. Thus, the UE may not combine the first and the second HARQ transmissions.

Figure 12:
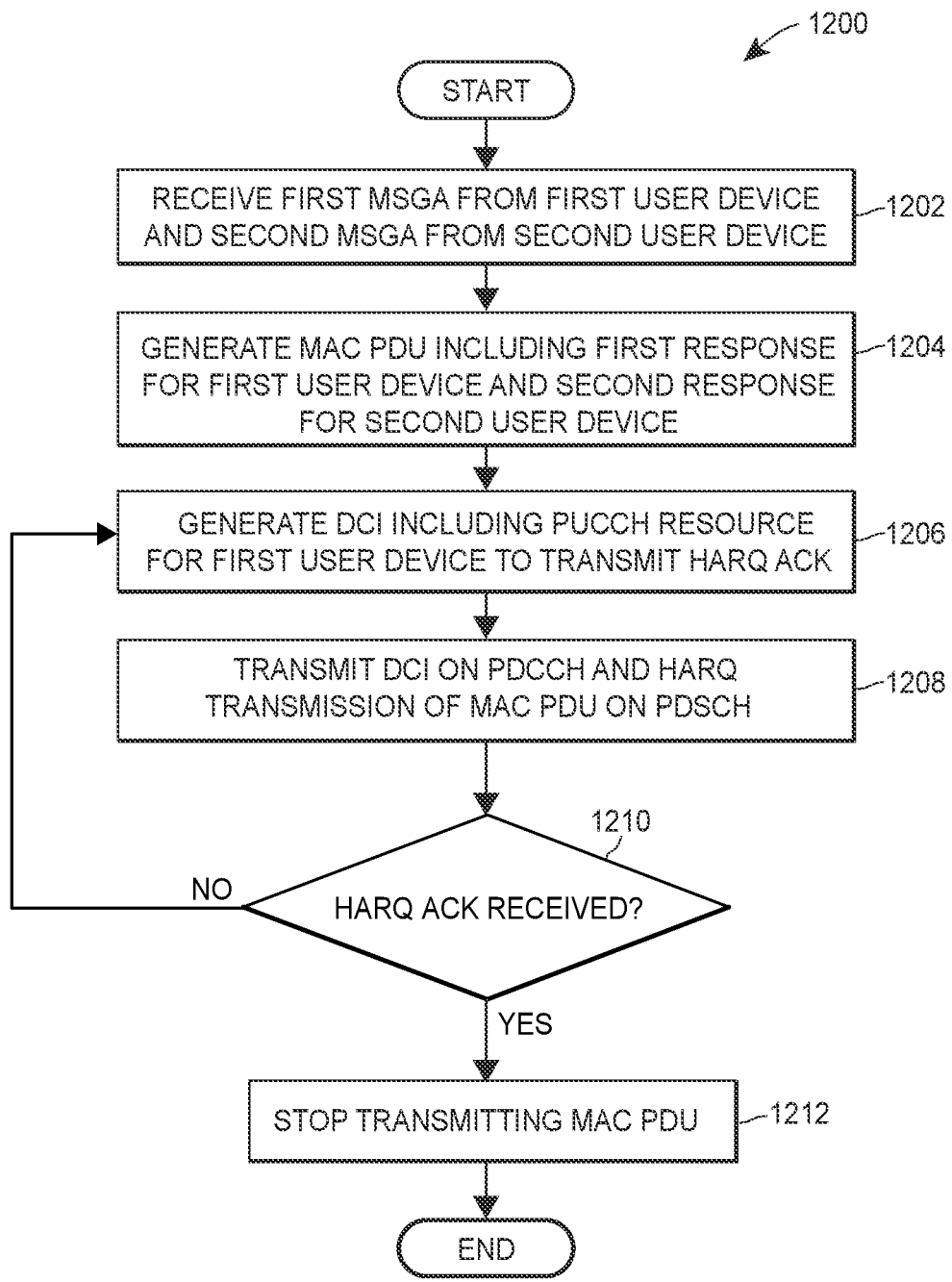
FIG. 12 is a flow diagram of an example method for granting access to several user devices to a communication channel by providing a first resource assignment via a DCI element to a user device of the several user devices for transmitting an acknowledgement of a response message from the base station, which can be implemented in the base station of FIG. 1.

Referring to FIG. 12, a method 1200 can be implemented in the processing hardware of a base station using hardware, firmware, software, or any suitable combination of hardware, firmware, and software. For convenience, FIG. 12 is discussed below with example reference to the base station 104, in which one or more of the modules 132-138 can implement the method 1200.

The method 1200 begins at block 1202, where the base station 104 receives a request to access a communication channel from several UEs 102, 106. Each request may be a MsgA having a random access preamble and a payload, such as a MsgA 1 and a MsgA 2. As a more specific example, the MsgAs can be associated with the transmissions 306, 308 of FIG. 3, and transmissions 406, 408 of FIG. 4.

At block 1204, the base station 104 generates a MAC PDU including a first response for the UE 102 that transmitted the first MsgA and including a second response for the UE 106 that transmitted the second MsgA. The first and second response may not include control channel resource assignments (e.g., PUCCH resource assignments) configuring a respective control channel resource (e.g., a PUCCH resource) for each of the UEs 102, 106 to transmit an acknowledgement (e.g., a HARQ ACK) of the first and second responses. The first response may include a contention resolution identity and a timing advance command. The first response may or may not include a temporary C-RNTI. The second response may include a random access preamble identity, an uplink grant and a timing advance command. The second response may include a temporary C-RNTI. As a more specific example, the MAC PDU can be associated with the transmission 312 of FIG. 3, and transmission 412 of FIG. 4.

The base station 104 generates a MAC PDU including a first response and a second response, respectively, for the first user device and the second user device. At block 1206, the base station 104 generates a DCI element which assigns a PDSCH resource and a control channel resource (e.g., a PUCCH resource). The control channel resource is assigned to the UE 102 for transmitting a HARQ ACK in response to receiving the first response or the MAC PDU. At block 1208, the base station 104 transmits the DCI element on a PDCCH and transmits a HARQ transmission of the MAC PDU. The base station 104 does not assign a PUCCH resource for the UE 106 to transmit an acknowledgement of the second response or the MAC PDU in the DCI element. Instead, the base station 104 includes in the second response a shared channel resource assignment (e.g., a PUSCH resource assignment (i.e., an uplink grant)) for the UE 106 to transmit a Msg3 including a data payload from the MsgA transmitted by the UE 106. As a more specific example, the DCI element can be associated with the transmission 310 of FIG. 3 and transmission 410 of FIG. 4.

If the base station 104 receives a HARQ ACK on the PUCCH resource from the UE 102 indicating that the UE 102 successfully decoded the first response, the base station 104 stops transmitting the MAC PDU (block 1210). If the base station 104 does not receive a HARQ ACK on the PUCCH resource from the UE 102 indicating that the UE 102 successfully decoded the first response, the base station 104 generates and transmits an additional DCI and retransmits the MAC PDU to the UE 102 (block 1206). As a specific example, the HARQ ACK can be associated with the transmission 322 of FIG. 3 and transmission 432 of FIG. 4. The additional DCI can be associated with the transmission 426 of FIG. 4. The retransmission of the MAC PDU can be associated with the transmission 428 of FIG. 4.

Figure 13:
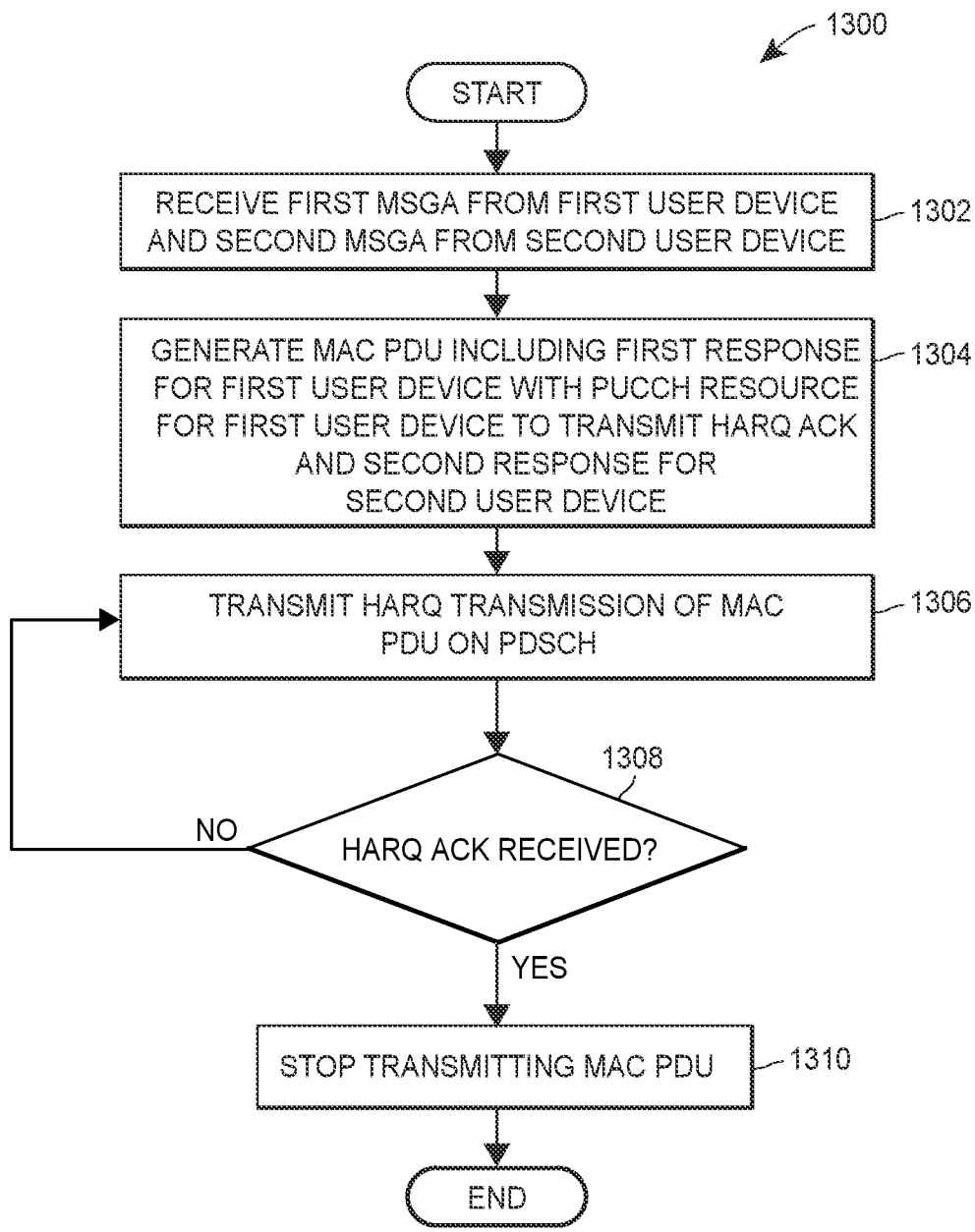
FIG. 13 is a flow diagram of an example method for granting access to several user devices to a communication channel by providing a first resource assignment via a MAC PDU to a user device of the several user devices for transmitting an acknowledgement of a response message from the base station, which can be implemented in the base station of FIG. 1.

Referring to FIG. 13, a method 1300 can be implemented in the processing hardware of a base station using hardware, firmware, software, or any suitable combination of hardware, firmware, and software. For convenience, FIG. 13 is discussed below with example reference to the base station 104, in which one or more of the modules 132-138 can implement the method 1300.

The method 1300 begins at block 1302, where the base station 104 receives a request to access a communication channel from several UEs 102, 106. Each request may be a MsgA having a random access preamble and a payload, such as a MsgA 1 and a MsgA 2. As a more specific example, the MsgAs can be associated with the transmissions 506, 508 of FIG. 5 and transmissions 606, 608 of FIG. 6.

At block 1304, the base station 104 generates a MAC PDU including a first response for the UE 102 that transmitted the MsgA 1, and including a second response for the UE 106 that transmitted the MsgA 2. The base station 104 includes in the first response a control channel resource assignment (e.g., PUCCH resource assignment) configuring a control channel resource (e.g., a PUCCH resource) for the UE 102 to transmit an acknowledgement (e.g., a HARQ ACK) of the first response. The base station 104 does not include in the second response a control channel resource assignment (e.g., PUCCH resource assignment) configuring a respective control channel resource (e.g., a PUCCH resource) for the UE 106 to transmit an acknowledgement (e.g., a HARQ ACK) of the second response. The base station 104 may include a contention resolution identity and a timing advance command in the first response. The base station 104 may or may not include a temporary C-RNTI in the first response. The base station 104 may include a random access preamble identity, an uplink grant and a timing advance command in the second response. The base station 104 may or may not include a temporary C-RNTI in the second response. The base station 104 also includes in the second response a shared channel resource assignment (e.g., a PUSCH resource assignment (i.e., an uplink grant)) for the UE 106 to transmit a Msg3. At block 1306, the base station 104 transmits a HARQ transmission of the MAC PDU. The base station 104 does not assign a PUCCH resource for the UE 106 to transmit an acknowledgement of the second response or the MAC PDU in the second response. As a more specific example, the MAC PDU including the first and second responses can be associated with the transmission 512 of FIG. 5 and transmission 612 of FIG. 6.

Then at block 1308, if the base station 104 receives a HARQ ACK on the control channel resource assigned in the control channel resource assignment from the UE 102 that successfully decoded the first response, the base station 104 stops transmitting the MAC PDU (block 1310). If the base station 104 does not receive a HARQ ACK on the control channel resource from the UE 102 that successfully decoded the first response, the base station 104 retransmits the MAC PDU to the UE 102 with a second PUCCH resource assignment (block 1306). As a specific example, the HARQ ACK can be associated with the transmission 522 of FIG. 5 and transmissions 632 of FIG. 6. The retransmission of the MAC PDU can be associated with the transmission 628 of FIG. 6.

Figure 14:
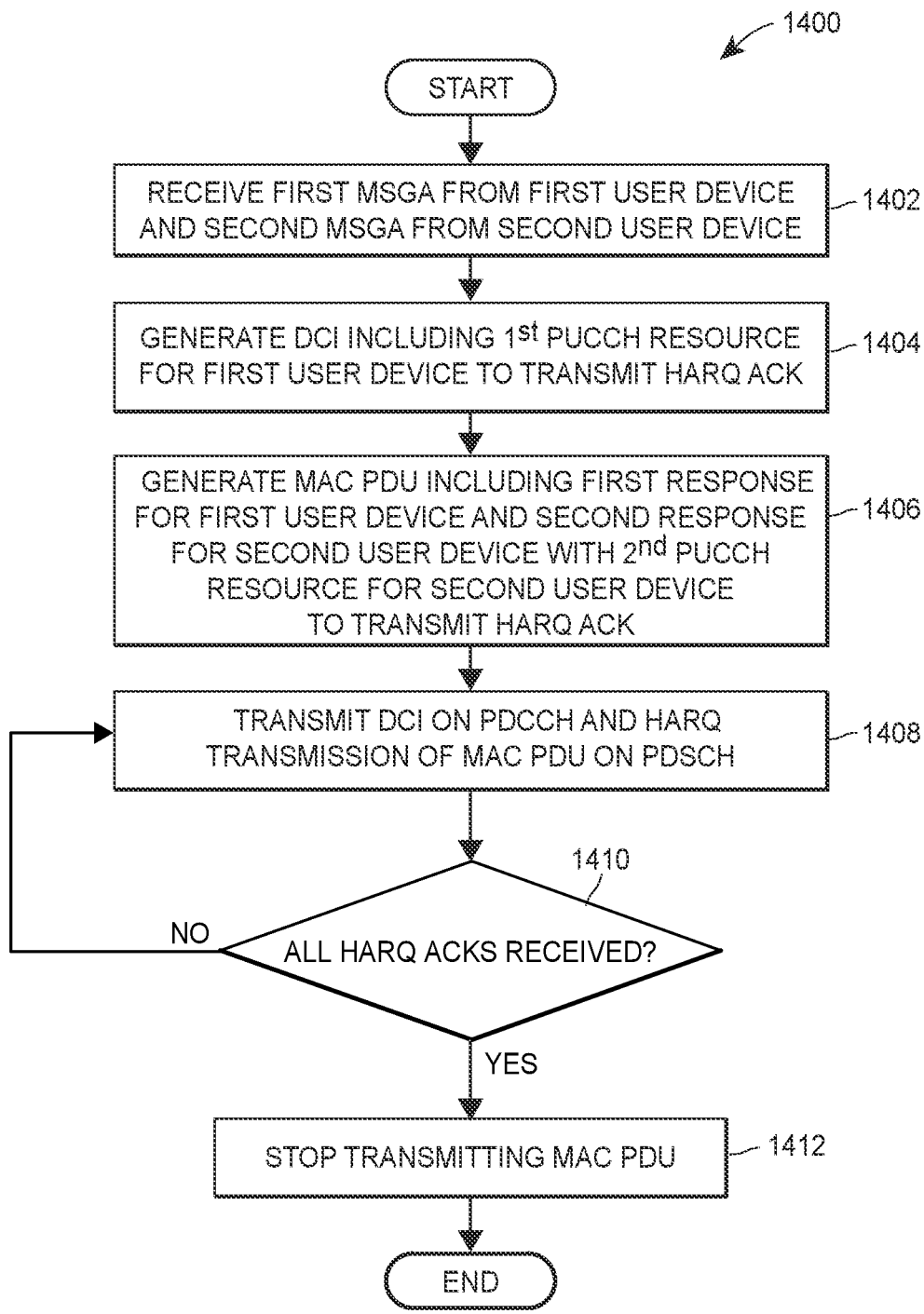
FIG. 14 is a flow diagram of an example method for granting access to several user devices to a communication channel by providing a first resource assignment via a DCI element and a second resource assignment via a MAC PDU to the user devices for transmitting acknowledgements of a response message from the base station, which can be implemented in the base station of FIG. 1.

Referring to FIG. 14, a method 1400 can be implemented in the processing hardware of a base station using hardware, firmware, software, or any suitable combination of hardware, firmware, and software. For convenience, FIG. 14 is discussed below with example reference to the base station 104, in which one or more of the modules 132-138 can implement the method 1400.

The method 1400 begins at block 1402, where the base station 104 receives a request to access a communication channel from several UEs 102, 106. Each request may be a MsgA having a random access preamble and a payload, such as a MsgA 1 and a MsgA 2. As a more specific example, the MsgAs can be associated with the transmissions 706, 708 of FIG. 7, transmissions 806, 808 of FIG. 8, transmissions 906, 908 of FIG. 9, transmissions 1006, 1008 of FIG. 10, and transmissions 1106, 1108 of FIG. 11.

At block 1404, the base station 104 generates a DCI element which assigns a PDSCH resource and a first control channel resource (e.g., a first PUCCH resource). The first control channel resource is assigned to the UE 102 for transmitting a first HARQ ACK in response to receiving the first response or the MAC PDU. As a more specific example, the DCI element can be associated with the transmission 710 of FIG. 7, transmission 810 of FIG. 8, transmission 910 of FIG. 9, transmission 1010 of FIG. 10, and transmission 1110 of FIG. 11.

At block 1406, the base station 104 generates a MAC PDU including a first response for the UE 102 that transmitted the first MsgA and including a second response for the UE 106 that transmitted the second MsgA. The second response may include a second control channel resource assignment (e.g., a second PUCCH resource assignment) configuring a second control channel resource (e.g., a second PUCCH resource) for the UE 106 to transmit an acknowledgement (e.g., a second HARQ ACK) of the second response. The first response may include a contention resolution identity and a timing advance command. The first response may or may not include a temporary C-RNTI. The second response may also include a contention resolution identity and a timing advance command. The second response may or may not include a temporary C-RNTI. As a more specific example, the MAC PDU can be associated with the transmission 712 of FIG. 7, transmission 812 of FIG. 8, transmission 912 of FIG. 9, transmission 1012 of FIG. 10, and transmission 1112 of FIG. 11.

Then at block 1408, the base station 104 transmits the DCI element on the PDCCH and the HARQ transmission of the MAC PDU on the PDSCH. If the base station 104 receives HARQ ACKs on the first and second PUCCH resources from the UE 102 and the UE 106 indicating that the UE 102 and the UE 106 successfully decoded the first response, the base station 104 stops transmitting the MAC PDU (block 1210). If the base station 104 does not receive a HARQ ACK on the first PUCCH resource from the UE 102 indicating that the UE 102 successfully decoded the first response, the base station 104 generates and transmits an additional DCI and retransmits the MAC PDU to the UE 102 (block 1206). If the base station 104 does not receive a HARQ ACK on the second PUCCH resource from the UE 106 indicating that the UE 106 successfully decoded the second response, the base station 104 generates and transmits an additional DCI and retransmits the MAC PDU to the UE 102 (block 1206). The additional DCI may include a third control channel resource assignment configuring a third control channel resource for the UE 102 to transmit a third HARQ ACK in response to receiving the first response or the MAC PDU. The MAC PDU may include a fourth control channel resource assignment configuring a fourth control channel resource for the UE 106 to transmit a third or fourth HARQ ACK in response to receiving the second response or the MAC PDU. The additional DCI can be associated with the transmission 826 of FIG. 8, transmission 926 of FIG. 9, transmission 1026 of FIG. 10, and transmission 1126 of FIG. 11. The retransmission of the MAC PDU can be associated with the transmission 828 of FIG. 8 and transmission 928 of FIG. 9.

In other implementations, if the base station 104 does not receive a HARQ ACK on the first PUCCH resource from the UE 102 indicating that the UE 102 successfully decoded the first response, the base station 104 generates and transmits an additional DCI and generates and transmits a second MAC PDU to the UE 102 (block 1406). The second MAC PDU includes the response 1 without including the response 2. If the base station 104 does not receive a HARQ ACK on the second PUCCH resource from the UE 106 indicating that the UE 106 successfully decoded the second response, the base station 104 generates and transmits an additional DCI and generates and transmits a second MAC PDU to the UE 106 (block 1406). The second MAC PDU includes response 2 without including the response 1. The base station 104 may include in the second MAC PDU a fourth PUCCH resource assignment configuring a fourth PUCCH resource for the UE 106 to transmit a third HARQ ACK. As a specific example, the HARQ ACK can be associated with the transmissions 722 and 724 of FIG. 7, transmissions 822 and 832 of FIG. 8, transmissions 922 and 932 of FIG. 9, transmissions 1022 and 1032 of FIG. 10, and transmissions 1122 and 1132 of FIG. 11. The second MAC PDU can be associated with the transmission 1028 of FIG. 10 and transmission 1128 of FIG. 11.

Figure 15:
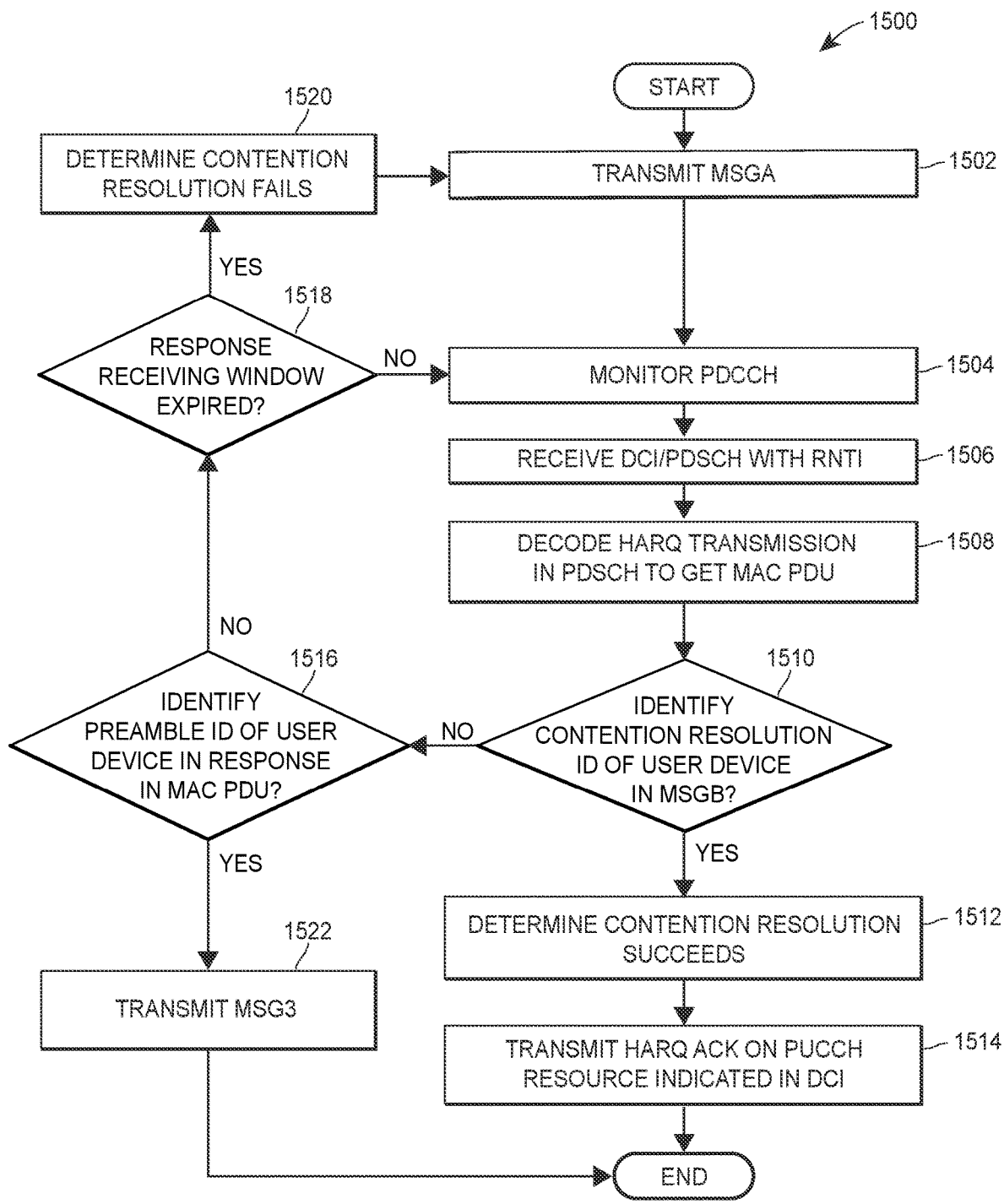
FIG. 15 is a flow diagram of an example method for requesting access to a communication channel by transmitting an acknowledgement of a response message from the base station via a channel resource assigned to the user device via a DCI element, which can be implemented in the user device of FIG. 1.

Referring to FIG. 15, a method 1500 can be implemented in the processing hardware of a UE using hardware, firmware, software, or any suitable combination of hardware, firmware, and software. For convenience, FIG. 15 is discussed below with example reference to the UE 102, in which one or more of the modules 122-126 can implement the method 1500. In other implementations, the UE 106 can implement the method 1500.

The method 1500 begins at block 1502, where the UE 102 transmits, to a base station 104, a request to access a communication channel. The request may be a MsgA having a random access preamble and a payload. As a more specific example, the MsgA can be associated with the transmissions 306 and 308 of FIG. 3, transmissions 706 and 708 of FIG. 7, transmissions 806 and 808 of FIG. 8, transmissions 906 and 908 of FIG. 9, transmissions 1006 and 1008 of FIG. 10, and transmissions 1106 and 1108 of FIG. 11.

At block 1504, the UE 102 starts monitoring PDCCH(s) in a response receiving window. The UE 102 monitors PDCCHs in the response receiving window with a first RNTI to receive a downlink MAC PDU including a corresponding response. If the UE 102 does not receive the corresponding response in the downlink MAC PDU within the response receiving window, the UE 102 determines that contention resolution fails (block 1520). If the response receiving window has not yet expired, the UE 102 continues monitoring PDCCH(s) with the first RNTI.

In some implementations, the UE 102 may start a timer to determine whether or not the response receiving window has ended. In other implementations, the UE 102 may start a counter to count the number of time units (e.g., subframes or slots) passed to determine whether or not the response receiving window has ended.

If the response receiving window has not ended, the UE 102 receives a DCI element with a CRC scrambled by a first RNTI on a PDCCH (block 1506). The DCI element may include a control channel resource assignment (e.g., a PUCCH resource assignment) configuring a control channel resource (e.g., a PUCCH resource) for the UE 102 to transmit an acknowledgement of a HARQ transmission and a PDSCH for receiving the HARQ transmission. In response to receiving a HARQ transmission on the PDSCH indicated by the DCI element, the UE 102 attempts to decode the HARQ transmission to obtain a MAC PDU having responses intended for several UEs (block 1508). If the UE 102 successfully decodes the HARQ transmission to obtain the MAC PDU, the UE 102 obtains a response 1 within the MAC PDU having a contention resolution identity that corresponds to the UE 102. For example, the contention resolution identity may be associated with or generated from content in the payload of the MsgA sent by the UE 102. If the UE 102 identifies a response 1 within the MAC PDU having a contention resolution identity that corresponds to the UE 102, the UE 102 determines contention resolution succeeds (block 1512). The UE 102 may transmit a HARQ ACK to the base station 104 on the control channel resource (e.g., the PUCCH resource) indicated in the DCI element (block 1514). As a specific example, the HARQ ACK can be associated with the transmission 322 of FIG. 3, transmission 432 of FIG. 4, transmission 722 of FIG. 7, transmission 832 of FIG. 8, transmission 922 of FIG. 9, transmission 1032 of FIG. 10, and transmission 1122 of FIG. 11.

If the UE 102 does not identify a response within the MAC PDU having a contention resolution identity that corresponds to the UE 102, the UE 102 may identify a response within the MAC PDU having a random access preamble identity that corresponds to the UE 102. For example, the random access preamble identity may be associated with or generated from the random access preamble of the MsgA sent by the UE 102. If the UE 102 identifies a response within the MAC PDU having a random access preamble identity that corresponds to the UE 102, the UE 102 may transmit the data payload from the MsgA sent by the UE 102 as a Msg3 in a HARQ transmission to the base station 104 on a shared channel resource (e.g., a PUSCH resource) indicated in the MAC PDU (block 1522). For example, if the UE executing the method 1500 is the UE 106, the UE 106 may receive the HARQ transmission on the PDSCH indicated by the DCI element. The HARQ transmission may include a MAC PDU having a response 2 which includes a random access preamble identity associated with the random access preamble in the MsgA sent by the UE 106. The response 2 may also include a shared channel resource assignment (e.g., a PUSCH resource assignment) configuring a shared channel resource (e.g., a PUSCH resource) for the UE 106 to transmit a data payload of the MsgA as a Msg3 to the base station 104. As a specific example, the Msg3 can be associated with the transmission 324 of FIG. 3, transmission 422 of FIG. 4, transmission 524 of FIG. 5, and transmission 622 of FIG. 6.

If the UE 102 does not identify a response within the MAC PDU having a contention resolution identity or a random access preamble identity that corresponds to the UE 102 and the response receiving window has expired, the UE 102 may determine that contention resolution fails (block 1520). Then the UE 102 may transmit a second MsgA or may initiate a four-step RACH. If the response receiving window has not yet expired, the UE 102 continues monitoring PDCCH(s) with the first RNTI.

Figure 16:
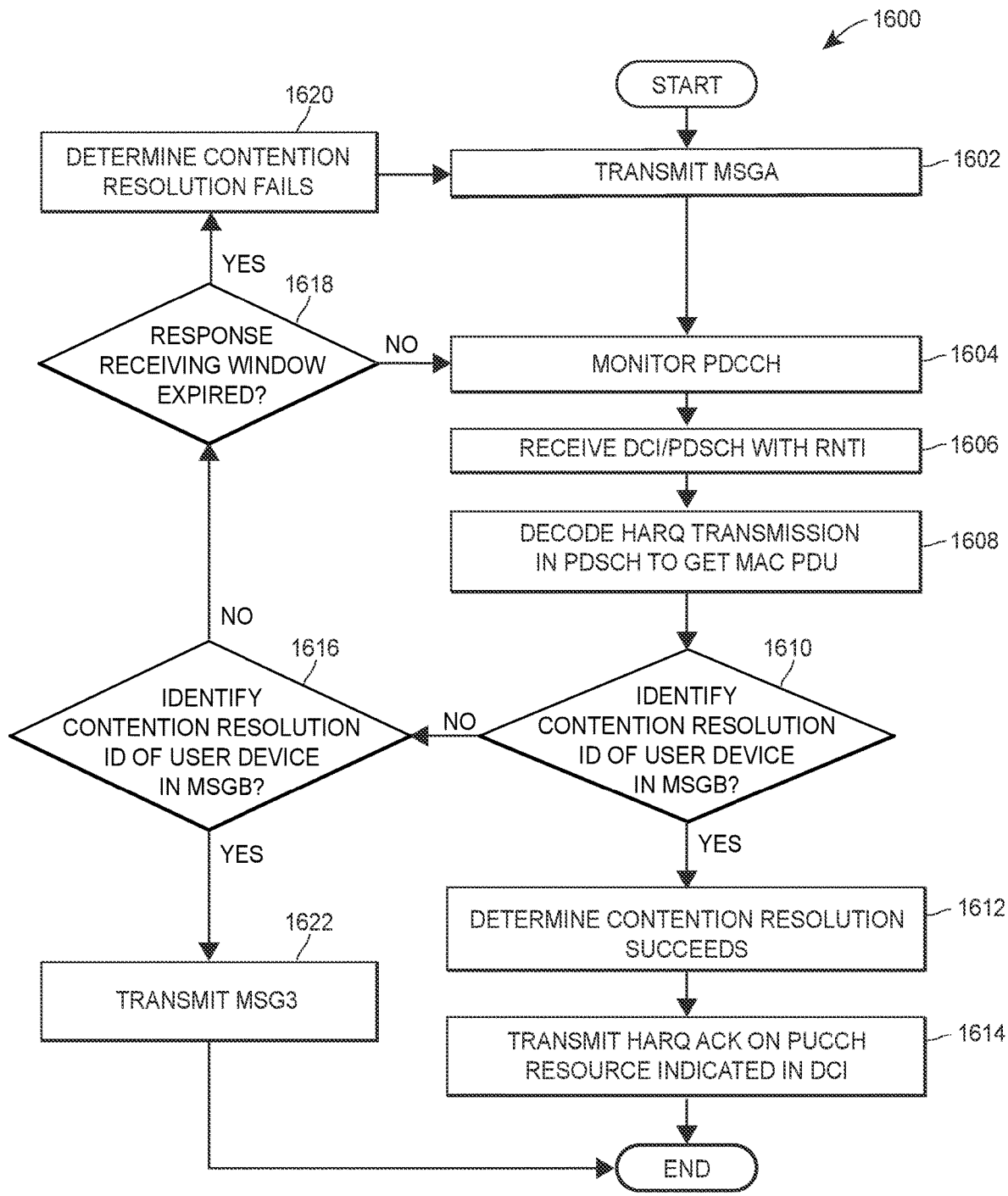
FIG. 16 is a flow diagram of an example method for requesting access to a communication channel by transmitting an acknowledgement of a response message from the base station via a channel resource assigned to the user device via a MAC PDU, which can be implemented in the user device of FIG. 1.

Referring to FIG. 16, a method 1600 can be implemented in the processing hardware of a UE using hardware, firmware, software, or any suitable combination of hardware, firmware, and software. For convenience, FIG. 16 is discussed below with example reference to the UE 102, in which one or more of the modules 122-126 can implement the method 1600. In other implementations, the UE 106 can implement the method 1600.

The method 1600 begins at block 1602, where the UE 102 transmits, to a base station 104, a request to access a communication channel. The request may be a MsgA having a random access preamble and a payload. As a more specific example, the MsgA can be associated with the transmissions 506 and 508 of FIG. 5, and transmissions 606 and 608 of FIG. 6.

At block 1604, the UE 102 starts monitoring PDCCH(s) in a response receiving window. The UE 102 monitors PDCCHs in the response receiving window with a first RNTI to receive a downlink MAC PDU including a corresponding response. If the UE 102 does not receive the corresponding response in the downlink MAC PDU within the response receiving window, the UE 102 determines that contention resolution fails (block 1620). If the response receiving window has not yet expired, the UE 102 continues monitoring PDCCH(s) with the first RNTI.

In some implementations, the UE 102 may start a timer to determine whether or not the response receiving window has ended. In other implementations, the UE 102 may start a counter to count the number of time units (e.g., subframes or slots) passed to determine whether or not the response receiving window has ended.

If the response receiving window has not ended, the UE 102 receives a DCI element with a CRC scrambled by a first RNTI on a PDCCH (block 1606). The DCI element may include a PDSCH for receiving a HARQ transmission. In response to receiving a HARQ transmission on the PDSCH indicated by the DCI element, the UE 102 attempts to decode the HARQ transmission to obtain a MAC PDU having responses intended for several UEs (block 1608). If the UE 102 successfully decodes the HARQ transmission to obtain the MAC PDU, the UE 102 obtains a response 1 within the MAC PDU having a contention resolution identity that corresponds to the UE 102. For example, the contention resolution identity may be associated with or generated from content in the payload of the MsgA sent by the UE 102. The response 1 also includes a control channel resource assignment (e.g., a PUCCH resource assignment) configuring a control channel resource (e.g., a PUCCH resource) for the UE 102 to transmit an acknowledgement of a HARQ transmission. If the UE 102 identifies a response 1 within the MAC PDU having a contention resolution identity that corresponds to the UE 102, the UE 102 determines contention resolution succeeds (block 1612). The UE 102 may transmit a HARQ ACK to the base station 104 on the control channel resource (e.g., the PUCCH resource) indicated in the response 1 of the MAC PDU (block 1614). As a specific example, the HARQ ACK can be associated with the transmission 522 of FIG. 5, and transmission 622 of FIG. 6.

In another example, if the UE executing the method 1600 is the UE 106, the UE 106 may receive the HARQ transmission on the PDSCH indicated by the DCI element. The HARQ transmission may include a MAC PDU having a response 2 which includes a contention resolution identity that corresponds to the UE 106. For example, the contention resolution identity may be associated with or generated from content in the payload of the MsgA sent by the UE 106. The response 2 may also include a control channel resource assignment (e.g., a PUCCH resource assignment) configuring a control channel resource (e.g., a PUCCH resource) for the UE 106 to transmit an acknowledgement of the HARQ transmission to the base station 104. If the UE 106 identifies a response 2 within the MAC PDU having a contention resolution identity that corresponds to the UE 106, the UE 106 determines contention resolution succeeds (block 1612).

The UE 106 may transmit a HARQ ACK to the base station 104 on the control channel resource (e.g., the PUCCH resource) indicated in the response 2 of the MAC PDU. As a specific example, the HARQ ACK can be associated with the transmission 724 of FIG. 7, transmission 822 of FIG. 8, transmission 932 of FIG. 9, transmission 1022 of FIG. 10, and transmission 1132 of FIG. 11.

If the UE 102 does not identify a response within the MAC PDU having a contention resolution identity that corresponds to the UE 102, the UE 102 may identify a response within the MAC PDU having a random access preamble identity that corresponds to the UE 102. For example, the random access preamble identity may be associated with or generated from the random access preamble of the MsgA sent by the UE 102. If the UE 102 identifies a response within the MAC PDU having a random access preamble identity that corresponds to the UE 102, the UE 102 may transmit the data payload from the MsgA sent by the UE 102 as a Msg3 in a HARQ transmission to the base station 104 on a shared channel resource (e.g., a PUSCH resource) indicated in the MAC PDU (block 1622). For example, if the UE executing the method 1600 is the UE 106, the UE 106 may receive the HARQ transmission on the PDSCH indicated by the DCI element. The HARQ transmission may include a MAC PDU having a response 2 which includes a random access preamble identity associated with the random access preamble in the MsgA sent by the UE 106. The response 2 may also include a shared channel resource assignment (e.g., a PUSCH resource assignment) configuring a shared channel resource (e.g., a PUSCH resource) for the UE 106 to transmit a data payload of the MsgA as a Msg3 to the base station 104. As a specific example, the Msg3 can be associated with the transmission 324 of FIG. 3, transmission 422 of FIG. 4, transmission 524 of FIG. 5, and transmission 622 of FIG. 6.

If the UE 102 does not identify a response within the MAC PDU having a contention resolution identity or a random access preamble identity that corresponds to the UE 102 and the response receiving window has expired, the UE 102 may determine that contention resolution fails (block 1620). Then the UE 102 may transmit a second MsgA or may initiate a four-step RACH. If the response receiving window has not yet expired, the UE 102 continues monitoring PDCCH(s) with the first RNTI.

Embodiments of the techniques described in the present disclosure may include any number of the following aspects, either alone or combination:

1. A method in a base station for granting access to a plurality of user devices to a communication channel, the method comprising: receiving, by processing hardware at the base station from at least a first user device and a second user device, at least a first request to access the communication channel and a second request to access the communication channel, the first request including a first random access preamble and a first data payload and the second request including a second random access preamble and a second data payload; and transmitting, by the processing hardware to the at least first and second user devices, a response message including at least a first control channel resource assignment configuring at least a first control channel resource for the at least first user device to transmit an acknowledgement of the response message.

2. The method according to aspect 1, wherein transmitting the response message includes: transmitting the response message further including at least a first shared channel resource assignment configuring at least a first shared channel resource for the at least second user device to transmit the second data payload.

3. The method according to any of the preceding aspects, wherein transmitting the response message includes: transmitting the response message further including at least a first response for the at least first user device and at least a second response for the at least second user device.

4. The method according to any of the preceding aspects, wherein the at least first response includes one or more first responses corresponding to one or more first user devices and the at least second response includes one or more second responses corresponding to one or more second user devices, each of the one or more first and second responses including a type of response as a successful random access response (RAR) or a fallback RAR, and each of the one or more first responses including a successful RAR, and each of the one or more second responses including a fallback RAR.

5. The method according to any of the preceding aspects, wherein transmitting the response message includes: transmitting a protocol data unit (PDU) associated with a media access control (MAC) layer, the PDU includes the one or more first responses and the one or more second responses positioned in an order in the PDU based on the type of response.

6. The method according to any of the preceding aspects, wherein transmitting the PDU includes: transmitting the PDU including each of the one or more first responses positioned in front of each of the one or more second responses.

7. The method according to any of the preceding aspects, wherein transmitting the PDU includes: transmitting a protocol data unit (PDU) associated with a media access control (MAC) layer, the PDU includes the one or more first responses and the one or more second responses positioned in an order in the PDU which is not based on the type of response, such that at least one first response is positioned between two or more second responses or at least one second response is positioned between two or more first responses.

8. The method according to any of the preceding aspects, wherein transmitting the response message includes: transmitting the response message having a downlink control information (DCI) element including the at least first control channel resource assignment and a protocol data unit (PDU) associated with a media access control (MAC) layer, the PDU including the at least first shared channel resource assignment.

9. The method according to any of the preceding aspects, further comprising: receiving, by the processing hardware from the at least first user device, an acknowledgement of the response message, transmitted on the at least first control channel resource; and receiving, by the processing hardware from the at least second user device, the second data payload, transmitted on the at least first shared channel resource.

10. The method according to any of the preceding aspects, wherein transmitting the response message includes: transmitting the response message having the PDU including a least a first identifier and a second identifier related to the at least first and second user devices.

11. The method according to any of the preceding aspects, wherein the response message is transmitted on a first channel and further comprising: in response to not receiving an acknowledgement of the response message from the at least first user device: transmitting, by the processing hardware to the at least first user device, a DCI element including an additional control channel resource assignment configuring an additional control channel resource for the at least first user device to transmit an acknowledgement of the response message; and retransmitting, by the processing hardware to the at least first user device, the response message on a second channel.

12. The method according to any of the preceding aspects, wherein transmitting the response message includes: transmitting the response message having a protocol data unit (PDU) associated with a media access control (MAC) layer, the PDU including the at least first control channel resource assignment and the at least first shared channel resource assignment.

13. The method according to any of the preceding aspects, further comprising: receiving, by the processing hardware from the at least first user device, an acknowledgement of the response message, transmitted on the at least first control channel resource; and receiving, by the processing hardware from the at least second user device, the second data payload, transmitted on the at least first shared channel resource.

14. The method according to any of the preceding aspects, wherein transmitting the response message includes: transmitting the response message having the PDU including a least a first identifier and a second identifier related to the at least first and second user devices.

15. The method according to any of the preceding aspects, wherein the response message is transmitted on a first channel and further comprising: in response to not receiving an acknowledgement of the response message from the at least first user device, retransmitting, by the processing hardware to the at least first user device, the PDU on a second channel.

16. The method according to any of the preceding aspects, wherein transmitting the response message includes: transmitting the response message further including at least a second control channel resource assignment configuring at least a second control channel resource for the at least second user device to transmit an acknowledgement of the response message, the at least first control channel resource assignment and at least second control channel resource assignment included in different portions of the response message.

17. The method according to any of the preceding aspects, wherein transmitting the response message includes: transmitting the response message having a downlink control information (DCI) element including the at least first control channel resource assignment and a protocol data unit (PDU) associated with a media access control (MAC) layer, the PDU including the at least second control channel resource assignment.

18. The method according to any of the preceding aspects, further comprising: receiving, by the processing hardware from the at least first and second user devices, an acknowledgement of the response message, transmitted on one of the at least first and second control channel resources.

19. The method according to any of the preceding aspects, further comprising: transmitting the response message having the PDU including a least a first identifier and a second identifier related to the at least first and second user devices.

20. The method according to any of the preceding aspects, wherein the response message is transmitted on a first channel and further comprising: in response to not receiving an acknowledgement of the response message from the at least first user device: transmitting, by the processing hardware to the at least first user device, a DCI element including an additional control channel resource assignment configuring an additional control channel resource for the at least first user device to transmit an acknowledgement of the response message; and retransmitting, by the processing hardware to the at least first user device, the PDU on a second channel.

21. The method according to any of the preceding aspects, wherein the response message is transmitted on a first channel and further comprising: in response to not receiving an acknowledgement of the response message from the at least second user device: transmitting, by the processing hardware to the at least second user device, the PDU on a second channel, the PDU including an additional control channel resource assignment configuring an additional control channel resource for the at least second user device to transmit an acknowledgement of the response message.

22. The method according to any of the preceding aspects, wherein the response message is transmitted on a first channel, the method further comprising: in response to not receiving an acknowledgement of the response message from the at least first user device: transmitting, by the processing hardware to the at least first user device, a DCI element including an additional control channel resource assignment configuring an additional control channel resource for the at least first user device to transmit an acknowledgement of the response message; and transmitting, by the processing hardware to the at least first user device, a second PDU on a second channel.

23. The method according to any of the preceding aspects, wherein the response message is transmitted on a first channel, the method further comprising: in response to not receiving an acknowledgement of the response message from the at least second user device: transmitting, by the processing hardware to the at least second user device, a second PDU on a second channel, the second PDU including an additional control channel resource assignment configuring an additional control channel resource for the at least second user device to transmit an acknowledgement of the response message.

24. A method in a first user device for requesting access to a communication channel, the method comprising: transmitting, by processing hardware at the first user device to a base station, a request to access the communication channel, the request include a random access preamble and a data payload; receiving, by the processing hardware, a response message to the request including at least a first channel resource assignment configuring at least a first channel resource for at least the first user device to transmit an acknowledgement of the response message or for at least the first user device to transmit the data payload and including an identifier for a second user device; and attempting to decode, by the processing hardware, the response message to identify the first channel resource assigned to the first user device.

25. The method according to aspect 24, wherein attempting to decode the response message includes: attempting to decode a downlink control information (DCI) element including at least a first control channel resource assignment configuring at least a first control channel resource for at least the first user device to transmit an acknowledgement of the response message; and attempting to decode a protocol data unit (PDU) associated with a media access control (MAC) layer, the PDU including at least a first identifier and a second identifier related to the at least first and second user devices.

26. The method according to either one of aspect 24 or aspect 25, further comprising: in response to successfully decoding the PDU, transmitting, by the processing hardware to the base station, an acknowledgement of the response message on the first control channel resource indicated in the DCI.

27. The method according to any of aspects 24-26, wherein the response message is received via a first channel, the method further comprising: in response to unsuccessfully decoding the PDU: receiving, by the processing hardware, a DCI element including an additional control channel resource assignment configuring an additional control channel resource for the first user device to transmit an acknowledgement of the response message; and receiving, by the processing hardware, the PDU on a second channel.

28. The method according to any of aspects 24-27, wherein the response message is received via a first channel, the method further comprising: in response to unsuccessfully decoding the PDU: receiving, by the processing hardware, a DCI element including an additional control channel resource assignment configuring an additional control channel resource for the first user device to transmit an acknowledgement of the response message; and receiving, by the processing hardware, a second PDU on a second channel.

29. The method according to any of aspects 24-28, wherein attempting to decode the response message includes: attempting to decode a protocol data unit (PDU) associated with a media access control (MAC) layer, the PDU including at least a first control channel resource assignment configuring at least a first control channel resource for at least the first user device to transmit an acknowledgement of the response message and including at least a first identifier and a second identifier related to the at least first and second user devices.

30. The method according to any of aspects 24-29, further comprising: in response to successfully decoding the PDU, transmitting, by the processing hardware to the base station, an acknowledgement of the response message on the first control channel resource.

31. The method according to any of aspects 24-30, wherein the response message is received via a first channel, the method further comprising: in response to unsuccessfully decoding the PDU: receiving, by the processing hardware, the PDU on a second channel including an additional control channel resource assignment configuring an additional control channel resource for the first user device to transmit an acknowledgement of the response message.

32. The method according to any of aspects 24-31, wherein the response message is received via a first channel, the method further comprising: in response to unsuccessfully decoding the PDU: receiving, by the processing hardware, a second PDU on a second channel including an additional control channel resource assignment configuring an additional control channel resource for the first user device to transmit an acknowledgement of the response message.

33. The method according to any of aspects 24-32, wherein attempting to decode the response message includes: attempting to decode a protocol data unit (PDU) associated with a media access control (MAC) layer, the PDU including at least a first shared channel resource assignment configuring at least a first shared channel resource for at least the first user device to transmit a data payload and including at least a first identifier and a second identifier related to the at least first and second user devices.

34. The method according to any of aspects 24-33, further comprising: in response to successfully decoding the PDU, transmitting, by the processing hardware to the base station, the data payload on the first shared channel resource.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-Internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for handling channel access procedures through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a base station for granting access to a plurality of user devices to a communication channel, the method comprising:
receiving, by the base station, at least a first request to access the communication channel from a first user device and a second request to access the communication channel from a second user device, the first request including a first random access preamble and a first data payload and the second request including a second random access preamble and a second data payload; and transmitting, by the base station to the at least first and second user devices, a response message including at least (i) a network identifier computed based on at least an orthogonal frequency division multiplexing (OFDM) symbol of the first request and an uplink (UL) carrier used for the first request, (ii) a first fallback random access response (RAR) for the first user device indicating to the first user device to fall back from a two-step random access channel (RACH) procedure to a four-step RACH procedure, (iii) a first channel resource assignment configuring a first channel resource for the first user device to transmit the first data payload, (iv) a second fallback RAR for the second user device indicating to the second user device to fall back from the two-step RACH procedure to the four-step RACH procedure, and (v) a second channel resource assignment configuring a second channel resource for the second user device to transmit the second data payload, the at least first and second channel resource assignments included in different portions of the response message.

2. The method of claim 1, wherein the response message further includes a successful RAR for a third user device.

3. The method of claim 2, wherein transmitting the response message includes:
transmitting a protocol data unit (PDU) associated with a media access control (MAC) layer, the PDU including the first fallback RAR, the second fallback RAR, and the successful RAR positioned in an order based on whether each RAR is a successful RAR or a fallback RAR.

4. The method of claim 2, wherein transmitting the response message includes:
transmitting a protocol data unit (PDU) associated with a media access control (MAC) layer, the PDU including the first fallback RAR, the second fallback RAR, and the successful RAR positioned in an order in the PDU which is not based on whether each RAR is a successful RAR or a fallback RAR, such that the successful RAR is positioned between the first and second fallback RARs.

5. The method of claim 1, further comprising:
receiving, by the base station from the at least second user device, the second data payload, transmitted on the at least second channel resource.

6. The method of claim 1, wherein transmitting the response message includes:
transmitting the response message including at least a first identifier related to the first user device and a second identifier related to the second user device.

7. A base station comprising processing hardware configured to:
receive at least a first request to access a communication channel from a first user device and a second request to access the communication channel from a second user device, the first request including a first random access preamble and a first data payload and the second request including a second random access preamble and a second data payload; and
transmit, to the at least first and second user devices, a response message including at least (i) a network identifier computed based on at least an orthogonal frequency division multiplexing (OFDM) symbol of the first request and an uplink (UL) carrier used for the first request, (ii) a first fallback random access response (RAR) for the first user device indicating to the first user device to fall back from a two-step random access channel (RACH) procedure to a four-step RACH procedure, (iii) a first channel resource assignment configuring a first channel resource for the first user device to transmit the first data payload, (iv) a second fallback RAR for the second user device indicating to the second user device to fall back from the two-step RACH procedure to the four-step RACH procedure, and (v) a second channel resource assignment configuring a second channel resource for the second user device to transmit the second data payload, the at least first and second channel resource assignments included in different portions of the response message.

8. The base station of claim 7, wherein the response message further includes a successful RAR for a third user device.

9. The base station of claim 8, wherein the response message further includes a protocol data unit (PDU) associated with a media access control (MAC) layer, the PDU including the first fallback RAR, the second fallback RAR, and the successful RAR positioned in an order based on whether each RAR is a successful RAR or a fallback RAR.

10. The base station of claim 8, wherein the response message further includes a protocol data unit (PDU) associated with a media access control (MAC) layer, the PDU including the first fallback RAR, the second fallback RAR, and the successful RAR positioned in an order in the PDU which is not based on whether each RAR is a successful RAR or a fallback RAR, such that the successful RAR is positioned between the first and second fallback RARs.

11. The base station of claim 7, wherein the processing hardware is further configured to:
receive, from the at least second user device, the second data payload, transmitted on the at least second channel resource.

12. The base station of claim 7, wherein the response message further includes at least a first identifier related to the first user device and a second identifier related to the second user device.

13. The base station of claim 7, wherein the response message further includes a media access control (MAC) service data unit (SDU) for a third user device.

14. A method in a first user device for requesting access to a communication channel, the method comprising:
transmitting, by the first user device to a base station, a request to access the communication channel, the request including a random access preamble and a data payload;
receiving, by the first user device, a response message to the request including at least (i) a network identifier computed based on at least an orthogonal frequency division multiplexing (OFDM) symbol of the first request and an uplink (UL) carrier used for the first request, (ii) a first fallback random access response (RAR) for the first user device indicating to the first user device to fall back from a two-step random access channel (RACH) procedure to a four-step RACH procedure, (iii) a first channel resource assignment configuring a first channel resource for the first user device to transmit the data payload, (iv) a second fallback RAR for a second user device indicating to the second user device to fall back from the two-step RACH procedure to the four-step RACH procedure, and (v) a second channel resource assignment configuring a second channel resource for the second user device to transmit a data payload, the at least first and second channel resource assignments included in different portions of the response message; and attempting to decode, by the first user device, the response message to identify the first channel resource assigned to the first user device.

15. The method of claim 14, wherein attempting to decode the response message includes:

attempting to decode a protocol data unit (PDU) associated with a media access control (MAC) layer, the PDU including at least a first identifier related to the first user device and a second identifier related to the second user device.

16. The method of claim 14, wherein attempting to decode the response message includes:

attempting to decode a protocol data unit (PDU) associated with a media access control (MAC) layer, the PDU including at least a first shared channel resource assignment configuring at least a first shared channel resource for at least the first user device to transmit a data payload and including at least a first identifier related to the first user device.

17. The method of claim 16, wherein the PDU includes the at least first shared channel resource assignment and the at least first identifier in a first response for the first user device, and the PDU includes a second identifier related to the second user device in a second response for the second user device.

18. The method of claim 14, further comprising:

transmitting, by the first user device, the data payload to the base station via the first channel resource in response to receiving the first fallback RAR in the response message.

* * * * *